US008698545B2

(12) United States Patent
Larson et al.

(10) Patent No.: US 8,698,545 B2
(45) Date of Patent: Apr. 15, 2014

(54) ANALOG MULTIPLIER AND METHOD FOR CURRENT SHUNT POWER MEASUREMENTS

(75) Inventors: Tony R. Larson, Tucson, AZ (US); Srikanth Vellore Avadhanam Ramamurthy, Tucson, AZ (US); Dimitar T. Trifonov, Vail, AZ (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/438,333

(22) Filed: Apr. 3, 2012

(65) Prior Publication Data

US 2013/0257507 A1 Oct. 3, 2013

(51) Int. Cl.
*G06F 7/44* (2006.01)

(52) U.S. Cl.
USPC ............................ 327/356; 327/359; 455/333

(58) Field of Classification Search
USPC ........................... 327/356, 357, 359; 455/333
See application file for complete search history.

(56) References Cited

U.S. PATENT DOCUMENTS 4,242,634 A * 12/1980 Metcalf ......................... 324/142
6,049,447 A * 4/2000 Roesch et al. .................. 361/58
7,197,292 B1 * 3/2007 Kouwenhoven et al. ..... 455/311

OTHER PUBLICATIONS

"A Chopper Stabilized CMOS Analog Multiplier with Ultra Low DC Offsets" by Ali Hadiashar and Joel L. Dawson, IEEE European Solid State Circuits Conference, in Montreux, Switzerland, pp. 364-367, Sep. 2006.

* cited by examiner

*Primary Examiner* — Kenneth B. Wells
(74) *Attorney, Agent, or Firm* — John R. Pessetto; Wade J. Brady, III; Frederick J. Telecky, Jr.

(57) ABSTRACT

Multiplier circuitry includes first multiplier circuit including a first transistor having an emitter coupled to a first conductor, a base coupled to a second conductor, and a collector coupled to a third conductor, a second transistor having an emitter coupled to the first conductor, a base coupled to a fourth conductor, and a collector coupled to a fifth conductor, a third transistor having an emitter coupled to the second conductor and a base and collector coupled to a supply voltage, and a fourth transistor having an emitter coupled to the fourth conductor and a base and collector coupled to the supply voltage. Chopper includes a first switch to provide a chopped differential signal between the second and fourth conductors and a second switch for un-chopping a first differential output signal produced between the third and fifth conductors to provide an un-chopped differential output signal between the third and fifth conductors.

19 Claims, 9 Drawing Sheets

ANALOG MULTIPLIER AND METHOD FOR CURRENT SHUNT POWER MEASUREMENTS

BACKGROUND OF THE INVENTION

The present invention relates generally to analog multiplier circuits, and more particularly to improvements to correct for transistor base current and gain limitations, input offset variations, and limited accuracy and linearity range in conventional analog multipliers.

The prior art includes the article "MOS stacked differential pair multipliers", J. L. Dawson and A. Hadiashar "A Chopper Stabilized CMOS Analog Multiplier with Ultra Low DC Offsets", IEEE European Solid State Circuits Conference, in Montreux, Switzerland, pages 364-367, September, 2006. The prior art also includes the assignee's INA210 current shunt monitor circuit, which only measures the voltage across a current shunt and provides a scaled representation of that voltage.

Chopped MOS stacked differential pairs are disclosed in the above mentioned Dawson and Hadiashar article and are used in a 4-quadrant multiplier in which the multiplier inputs and outputs are differential. The chopping scheme illustrated is complex because it chops one set of inputs and "un-chops" the output, and then it chops another set of inputs and again un-chops the output, in a complex 4-quadrant fashion in order to maintain the correct output signal polarity. It is impractical to correct the gain errors of MOS stacked differential pair multipliers because the transconductance of a MOS differential pair drifts with temperature and changes with the differential input voltage. Furthermore, MOS stacked differential pair multipliers as disclosed in the Dawson and Hadiashar article are accurate only for very small voltage magnitude inputs.

The topology of MOS stacked differential pair multipliers, which sometimes have been referred to as Gilbert multipliers, is significantly different from the subsequently described conventional basic translinear Gilbert multiplier invented by Barry Gilbert. The MOS stacked differential pair multipliers use one differential input pair of MOS transistors, controlled by one voltage input, to feed the tail currents of other differential pairs controlled by the second voltage input, in contrast to translinear Gilbert multipliers, which are composed of bipolar transistors and rely on the logarithmic/exponential characteristic of bipolar transistors.

The closest prior art is believed to include a conventional translinear bipolar Gilbert multiplier, which is composed of bipolar transistors rather than MOS transistors and is hereinafter referred to as a "translinear Gilbert multiplier" to clearly distinguish it from MOS multipliers which are sometimes also referred to as Gilbert multipliers.

FIG. 1 shows a conventional translinear Gilbert multiplier 1-1 which includes bipolar NPN transistors Q0 and Q1 each having its emitter connected to conductor 4. An input current $I_Y$ flows out of conductor 4, and is a single-ended input current of translinear Gilbert multiplier 1-1. The base of transistor Q0 is connected by conductor 2 to the emitter of a diode-connected NPN transistor Q2, the base and collector of which are connected by conductor 7 to $V_{DD}$. An input current $I_{X+}$ flows out of conductor 2. The collector of transistor Q0 is connected to an output conductor 5 into which a multiplier output current $I_{Mout+}$ flows. Similarly, the base of transistor Q1 is connected by conductor 3 to the emitter of a diode-connected NPN transistor Q3, the base and collector of which are connected by conductor 7 to $V_{DD}$. An input current $I_{X-}$ flows out of conductor 3, and the current $I_{X+}-I_{X-}$ constitutes a differential input current of translinear Gilbert multiplier 1-1. The collector of transistor Q1 is connected to an output conductor 6 into which a multiplier output current $I_{Mout-}$ flows.

The average of $I_{X+}$ and $I_{X-}$ is equal to $(I_{X+}+I_{X-})/2$ and is referred to as the reference current Iref, and the two differential quantities $I_{MOut+}-I_{MOut-}$ and $V_{MOut+}-V_{MOut-}$ are the "multiplier results".

Chopping is a well known technique for eliminating input offset voltages in operational amplifiers and the like. Chopping continually swaps the two amplifier inputs. Since the inputs of an operational amplifier usually are at essentially the same voltage except for the amplifier input offset voltage which is only a few millivolts, the input node voltages do not change very much as they are swapped during the chopping operation. That means any parasitic capacitance associated with those nodes does not receive and discharge very much charge when going from one chopping state to the other.

However, chopping of relatively high current input signals of an amplifier ordinarily would be avoided because it would result in relatively large signal swings in response to the steep rising and falling edges of the chopping signal. Such large signal swings would be problematic. For example, in a chopped operational amplifier with feedback, the voltage excursions at the feedback input of the operational amplifier are very small, typically only a few millivolts. Since there is a "virtual short circuit" between the input terminals of an operational amplifier with feedback, the chopping or swapping (i.e., the swapping of the two inputs) results in the swapping or interchanging of two conductors of voltages which differ only by a few millivolts of input offset voltage of the operational amplifier. Consequently, the operational amplifier output only needs to move the feedback input of the operational amplifier a few millivolts to maintain the required virtual input short circuit. That results in very fast settling of the output and the feedback input of the operational amplifier. In a conventional operational amplifier, one ordinarily would not chop the operational amplifier inputs if it was necessary for them to change by hundreds of millivolts or more because of the resulting capacitance charging issues and voltage settling issues with the amplifier.

Chopping is impractical in most current mode circuits because it results in large voltage swings, especially at high impedance nodes. The large voltage swings cause various signal settling problems. The operational amplifier has to settle to its final values within the chopping cycle time frame in order to avoid large circuit operating errors. Furthermore, the capacitance associated with the operational amplifier signal terminals may need to be supplied with a significant amount of current in order to charge the terminals to their final voltages.

The gain of the above described translinear Gilbert multiplier cell is much more stable than the gain of the MOS stacked pair multiplier cell. The gain of the translinear Gilbert multiplier cell varies by approximately ±7%, whereas the gain of the MOS stacked pair multiplier cell varies by roughly ±30% or more due to process and temperature variations. However, conventional translinear Gilbert multiplier circuits suffer from various effects that have made them unsuitable for achieving current shunt power measurement accuracies with errors in the ±1% range. Nevertheless, there would be a substantial market for an economical analog multiplier that is capable of achieving accuracy wherein the errors are within the ±1% range or better over widely varying multiplier inputs.

Thus, there is an unmet need for an analog multiplier that is substantially more accurate than the closest prior art MOS stacked differential pair multipliers and translinear Gilbert multipliers.

There also is an unmet need for an analog multiplier which is capable of providing accuracies wherein the errors due to input offset voltage variations and gain variations are within a range of ±1% deviation from ideal.

There also is an unmet need for an analog multiplier which is capable of being used in a current shunt monitor circuit which provides power measurement accuracy wherein the errors are within a range of approximately ±1% deviation from ideal over a wide range of temperature and integrated circuit manufacturing process variations.

SUMMARY OF THE INVENTION

It is an object of the invention to provide an analog multiplier that is substantially more accurate than the closest prior art MOS stacked differential pair multipliers and translinear Gilbert multipliers.

It is another object of the invention to provide an analog multiplier which is capable of providing accuracies wherein the errors due to input offset voltage variations and gain variations are within a range of 1% deviation from ideal.

It is another object of the invention to provide an analog multiplier which is capable of being used in a current shunt monitor circuit which provides power measurement accuracy wherein the errors are within a range of approximately ±1% deviation from ideal over a wide range of temperature and integrated circuit manufacturing process variations.

Briefly described, and in accordance with one embodiment, the present invention provides analog multiplier circuitry (1-3) including first multiplier circuit (1) having a first transistor (Q0) with an emitter coupled to a first conductor (4), a base coupled to a second conductor (2), and a collector coupled to a third conductor (5), a second transistor (Q1) with an emitter coupled to the first conductor, a base coupled to a fourth conductor (3), and a collector coupled to a fifth conductor (6), a third transistor (Q2) with an emitter coupled to the second conductor and a base and collector coupled to a supply voltage, and a fourth transistor (Q3) with an emitter coupled to the fourth conductor and a base and collector coupled to the supply voltage. Chopping circuitry (22,23) includes a first X switch (22) for chopping a first differential input signal ($I_{X+}-I_{X-}$) between a sixth (2-1) and seventh (3-1) conductors to provide a chopped differential input signal between the second and fourth conductors and a second X switch (23) for un-chopping a first differential output signal ($V_{Mout+}$, $-V_{Mout-}$) produced between the third and fifth conductors to provide an un-chopped differential output signal between eighth (5-1) and ninth (6-1) conductors.

In one embodiment, the first multiplier circuit (1-3) includes a segmented translinear Gilbert multiplier (1-2) comprised of a plurality of multiplier cells (CELLS 1, 2 . . . ) interconnected so as to reduce the input offset voltage of the segmented translinear Gilbert multiplier (1-2).

In one embodiment, the analog multiplier circuitry (10) includes first (12A) and second (12B) correction circuits, wherein the first correction circuit (12A) includes a fifth transistor (Q7) which has a base current equal to a base current of the first transistor (Q0), and operates in response to the base current of the fifth transistor (Q7) to subtract a current equal to the base current of the first transistor (Q0) from a first current ($I_{VLoad}$) in the first conductor (4) and also to provide a correction current equal to the base current of the first transistor (Q0) in the second conductor (2) to correct the first differential input signal ($I_{X+}-I_{X-}$) for errors caused by the base current of the first transistor (Q0). The second correction circuit (12B) includes a sixth transistor (Q6) which has a base current equal to a base current of the second transistor (Q1), and operates in response to the base current of the sixth transistor (Q7) to subtract a current equal to the base current of the second transistor (Q1) from the first current ($I_{VLoad}$) in the first conductor (4) and also to provide a correction current equal to the base current of the second transistor (Q1) in the fourth conductor (3) to correct the first differential input signal ($I_{X+}-I_{X-}$) for errors caused by the base current of the second transistor (Q1).

In a described embodiment, the first correction circuit (12A) includes a first operational amplifier (13A) having a first input (−) coupled to the base of the fifth transistor (Q7), an output (15A) operative to control the flow of the base current of the fifth transistor (Q7) in a first current mirror (MP3,2,10), and a second input (+) coupled to the second conductor (2) and a first output (2,drain of MP2) of the first current mirror (MP3,2,10). The first output (2,drain of MP2) of the first current mirror (MP3,2,10) supplies base current to the first transistor (Q0) to effectively add the correction current equal to the base current of the first transistor (Q0) into the second conductor (2). A second output (drain of MP10) of the first current mirror (MP3,2,10) is coupled to control a second current mirror (MN5,6,9). A first output (drain of MN6) of the second current mirror (MN5,6,9) is coupled to subtract the current equal to the base current of the first transistor (Q0) from the first current ($I_{VLoad}$) in the first conductor (4), and a second output (drain of MN9) of the second current mirror (MN5,6,9) is coupled to subtract the current equal to the base current of the first transistor (Q0) from a second current ($I_{VLoad2}$) in a sixth conductor (11) connected to an emitter of the fifth transistor (Q7). The second correction circuit (12B) includes a second operational amplifier (13B) having a first input (−) coupled to the base of the sixth transistor (Q6), an output (15B) operative to control the flow of the base current of the sixth transistor (Q6) in a third current mirror (MP0,1,11), and a second input (+) coupled to the fourth conductor (3) and a first output (3,drain of MP1) of the third current mirror (MP0,1,11). The first output (3,drain of MP1) of the third current mirror (MP0,1,11) supplies base current to the second transistor (Q1) to effectively add the correction current equal to the base current of the second transistor (Q1) into the fourth conductor (3). A second output (drain of MP11) of the third current mirror (MP0,1,11) is coupled to control a fourth current mirror (MN8,7,10), and a first output (drain of MN7) of the fourth current mirror (MN8,7,10) is coupled to subtract the current equal to the base current of the second transistor (Q1) from the first current ($I_{VLoad}$) in the first conductor (4). A second output (drain of MN10) of the fourth current mirror (MN8,7,10) is coupled to subtract the current equal to the base current of the second transistor (Q1) from the second current ($I_{VLoad2}$) in the sixth conductor (11), and the sixth conductor (11) is connected to an emitter of the sixth transistor (Q6).

In one embodiment, the analog multiplier circuitry (1-6) includes a first circuit (46) for generating a first component of the first current ($I_{VLoad}$) in response to a voltage (SenseSupply) representative of a second supply voltage ($V_{SUPPLY}$) applied to a first terminal of a shunt resistor ($R_{SHUNT}$) and for generating a DC signal (Iref=($I_{X+}+I_{X-}$)/2) on which the first differential input signal ($I_{X+}-I_{X-}$) is superimposed. The analog multiplier circuitry (1-6) also includes a second circuit (47) for generating values of the first differential input signal ($I_{X+}-I_{X-}$) in accordance with a sensing voltage (Vsense) developed across the shunt resistor ($R_{SHUNT}$) in response to a load current ($I_{Load}$) flowing through the shunt resistor ($R_{SHUNT}$). The first differential output signal ($V_{Mout+}$, $-V_{Mout-}$) represents the product of the current ($I_{Load}$) flowing through the shunt resistor ($R_{SHUNT}$) and the supply voltage ($V_{SUPPLY}$). In one embodiment, the first circuit (46) also generates a first component of the second current ($I_{VLoad2}=I_{VLoad}$) in response to the supply voltage (SenseSupply), and wherein the analog multiplier circuitry (1-6) also includes a second circuit (47) for generating first (CORRECTION TO $I_{VLoad}$) and second (CORRECTION TO $I_{VLoad2}$) correction currents in accordance with a power supply range signal (nLowSupply) to be superimposed on the first current ($I_{VLoad}$) and the second current ($I_{VLoad2}$), respectively. In one embodiment, the second circuit (47) includes circuitry (48) for adjusting the first current ($I_{VLoad}$) according to a supply voltage range control signal (nLowSupply, nMedSupply, or nHighSupply).

In one embodiment, an output amplifier (31) having inputs coupled to receive the differential output signal ($V_{Mout+}$, $-V_{Mout-}$) provides feedback through the second X switch (23) to the inputs of the output amplifier (31). In one embodiment, a third X switch (34) is coupled between the output of the output amplifier (31) and an input of an output buffer (43) having an output is coupled to the second X switch (23). In one embodiment, a low pass filter (39) is coupled between the third X switch (34) and the input of the output buffer (43).

In one embodiment, the segmented translinear Gilbert multiplier (1-2) includes a first translinear Gilbert multiplier cell (CELL 1) including the first (Q0), second (Q1), third (Q2), and fourth (Q3) transistors, and wherein the segmented translinear Gilbert multiplier (1-2) also includes a second translinear Gilbert multiplier cell (CELL 2) having a topology essentially the same as the first translinear Gilbert multiplier cell (CELL 1) and including first (Q0), second (Q1), third (Q2), and fourth (Q3) transistors in a second translinear Gilbert multiplier cell (CELL 2). A first X switch (19-1) couples an emitter of the third transistor (Q2) of the second translinear Gilbert multiplier cell (CELL 2) to the emitter of one of the third (Q2) and fourth (Q3) transistors of the first Gilbert cell (CELL 1) and couples an emitter of the fourth transistor (Q3) of the second translinear Gilbert multiplier cell (CELL 2) to the emitter of the other of the third (Q2) and fourth (Q3) transistors of the first translinear Gilbert multiplier cell (CELL 1), in response to an offset adjustment signal (SwitchContr2). The emitters of the first (Q0) and second (Q1) transistors of the second translinear Gilbert multiplier cell (CELL 2) are directly coupled to the emitters of the first (Q0) and second (Q1) transistors, respectively, of the first translinear Gilbert multiplier cell (CELL 1). The segmented translinear Gilbert multiplier (1-2) also includes a second X switch (20-1) for coupling a collector of the first transistor (Q0) of the second translinear Gilbert multiplier cell (CELL 2) to the collector of one of the first (Q0) and second (Q1) transistors of the first Gilbert cell (CELL 1) and for coupling a collector of the second transistor (Q1) of the second translinear Gilbert multiplier cell (CELL 2) to the collector of the other of the first (Q0) and second (Q2) transistors of the first translinear Gilbert multiplier cell (CELL 1), in response to the offset adjustment signal (SwitchContr2).

In one embodiment, the first correction circuit (12A) is coupled to the second (2) and fourth (3) conductors by means of a first Y switch (25A) and the second correction circuit (12B) is coupled to the second (2) and fourth (3) conductors by means of a second Y switch (25B). A first input of each of the first (25A) and second (25B) Y switches is coupled to the fourth conductor (3), and a second input of each of the first (25A) and second (25B) Y switches is coupled to the second conductor (3), the first (25A) and second (25B) Y switches being operative to alternately couple the first (12A) and second (12B) correction circuits to opposite ones of the second (2) and fourth (3) conductors during alternate cycles of a chopping control signal (CHOP CONTROL) that also controls the chopping circuitry (22,23).

In one embodiment, the invention provides a method for providing increased accuracy in an analog multiplier, the method including providing a first multiplier circuit (1) including a first transistor (Q0) having an emitter coupled to a first conductor (4), a base coupled to a second conductor (2), and a collector coupled to a third conductor (5), a second transistor (Q1) having an emitter coupled to the first conductor (4), a base coupled to a fourth conductor (3), and a collector coupled to a fifth conductor (6), a third transistor (Q2) having an emitter coupled to the second conductor (2) and a base and collector coupled to a first supply voltage ($V_{DD}$), and a fourth transistor (Q3) having an emitter coupled to the fourth conductor (3) and a base and collector coupled to the first supply voltage ($V_{DD}$); chopping a first differential input signal ($I_{X+}-I_{X-}$) between a sixth conductor (2-1) and a seventh conductor (3-1) to provide a corresponding chopped differential input signal ($I_{X+}-I_{X-}$) between the second (2) and fourth (3) conductors; and un-chopping a first differential output signal ($I_{Mout+}$, $-I_{Mout-}$) produced between the third (5) and fifth (6) conductors by the first multiplier circuit (1) to provide a corresponding un-chopped differential output signal ($I_{Mout+}$, $-I_{Mout-}$) between an eighth conductor (5-1) and a ninth (6-1) conductor.

In one embodiment, the method includes providing a transistor base current that is equal to a base current of the first transistor (Q0) and using the provided transistor base current to produce correction current equal to the base current of the first transistor (Q0) which is subtracted from a first current ($I_{VLoad}$) in the first conductor (4), and providing another transistor base current that is equal to a base current of the first transistor (Q0) and using that provided transistor base current to produce correction current equal to the base current of the second transistor (Q1) which is subtracted from the first current ($I_{VLoad}$), and using the provided transistor base current equal to the base current of the first transistor (Q0) to add a correction current into the second conductor (2), and using the provided transistor base current equal to the base current of the second transistor (Q1) to add a correction current into the fourth conductor (2).

In one embodiment, the method includes generating a first component of the first current ($I_{VLoad}$) in response to a supply voltage ($V_{SUPPLY}$) applied to a first terminal of a shunt resistor ($R_{SHUNT}$), and generating a DC signal ($Iref=(I_{X+}+I_{X-})/2$) on which the first differential input signal ($I_{X+}-I_{X-}$) is superimposed, and also generating values of the first differential input signal ($I_{X+}-I_{X-}$) in accordance with a sensing voltage (Vsense) developed across the shunt resistor ($R_{SHUNT}$) in response to a load current flowing through the shunt resistor ($R_{SHUNT}$), wherein the first differential output signal ($V_{Mout+}-V_{Mout-}$) represents the product of the current flowing through the shunt resistor ($R_{SHUNT}$) multiplied by the supply voltage ($V_{SUPPLY}$).

In one embodiment, the method includes providing the first multiplier circuit (1) as a combination of multiple multiplier cells (CELLS 1, 2 . . . ) and interconnecting the multiple multiplier cells so as to reduce the input offset voltage of the segmented translinear Gilbert multiplier (1-2 in response to an offset adjustment signal (SwitchContr2).

In one embodiment, the invention provides an analog multiplier circuit including a first multiplier circuit (1) including a first transistor (Q0) having an emitter coupled to a first conductor (4), a base coupled to a second conductor (2), and a collector coupled to a third conductor (5), a second transistor (Q1) having an emitter coupled to the first conductor (4), a base coupled to a fourth conductor (3), and a collector coupled to a fifth conductor (6), a third transistor (Q2) having an emitter coupled to the second conductor (2) and a base and collector coupled to a first supply voltage ($V_{DD}$), and a fourth transistor (Q3) having an emitter coupled to the fourth conductor (3) and a base and collector coupled to the first supply voltage ($V_{DD}$); means (22) for chopping a first differential input signal ($I_{X+}-I_{X-}$) between a sixth conductor (2-1) and a seventh conductor (3-1) to provide a corresponding chopped differential input signal ($I_{X+}-I_{X-}$) between the second (2) and fourth (3) conductors; and means (23) for un-chopping a first differential output signal ($I_{Mout+}-I_{Mout-}$) produced between the third (5) and fifth (6) conductors by the first multiplier circuit (1) to provide a corresponding un-chopped differential output signal ($I_{Mout+}-I_{Mout-}$) between an eighth conductor (5-1) and a ninth (6-1) conductor.

In one embodiment, the invention provides segmented analog multiplier circuitry (1-2) including a first multiplier circuit (CELL 1) including a first transistor (Q0) having an emitter coupled to a first conductor (4), a base coupled to a second conductor (2), and a collector coupled to a third conductor (5), a second transistor (Q1) having an emitter coupled to the first conductor (4), a base coupled to a fourth conductor (3), and a collector coupled to a fifth conductor (6), a third transistor (Q2) having an emitter coupled to the second conductor (2) and a base and collector coupled to a first supply voltage ($V_{DD}$), and a fourth transistor (Q3) having an emitter coupled to the fourth conductor (3) and a base and collector coupled to the first supply voltage ($V_{DD}$). Second multiplier circuit (CELL 2) includes a first transistor (Q0) having an emitter coupled to the first conductor (4), a base coupled to a sixth conductor (2-2), and a collector coupled to a seventh conductor (5-2), a second transistor (Q1) having an emitter coupled to the first conductor (4), a base coupled to an eighth conductor (3-2), and a collector coupled to a ninth conductor (6-2), a third transistor (Q2) having an emitter coupled to sixth conductor (2-2) and a base and collector coupled to the first supply voltage ($V_{DD}$), and the eighth transistor (Q3) having an emitter coupled to the fourth conductor (3-2) and a base and collector coupled to the first supply voltage ($V_{DD}$). A first X switch (19-1) has a first port coupled to the sixth (2-2) and eighth (3-2) conductors and a second port coupled to the second (2) and fourth (3) conductors, for repetitively swapping connections of the second (2) and fourth (3) conductors to the sixth (2-2) and eighth (3-2) conductors, respectively, in response to a switching control signal (SwitchContr2). A second X switch (20-1) has a first port coupled to the third (5) and fifth (6) conductors and a second port coupled to the seventh (5-2) and ninth (6-2)) conductors, for repetitively swapping connections of the third (5) and fifth (6) conductors to the seventh (5-2) and ninth (6-2) conductors, respectively, in response to the switching control signal (SwitchContr2). The first multiplier cell (CELL 1) is coupled to the second multiplier cell (CELL 2) in response to an offset adjustment signal (SwitchContr2) so as to obtain at least partial cancellation of input offset voltages of the first multiplier cell (CELL 1) and the second multiplier cell (CELL 2) to obtain a reduced net input offset voltage of the segmented analog multiplier circuitry (1-2).

In one embodiment, the invention provides base current corrected analog multiplier circuitry (10) including a multiplier circuit (1) having a first transistor (Q0) with an emitter coupled to a first conductor (4), a base coupled to a second conductor (2), and a collector coupled to a third conductor (5). A second transistor (Q1) has an emitter coupled to the first conductor (4), a base coupled to a fourth conductor (3), and a collector coupled to a fifth conductor (6). A third transistor (Q2) has an emitter coupled to the second conductor (2) and a base and collector coupled to a first supply voltage ($V_{DD}$), and a fourth transistor (Q3) has an emitter coupled to the fourth conductor (3) and a base and collector coupled to the first supply voltage ($V_{DD}$). A first correction circuit (12A) includes a fifth transistor (Q7) which has a base current equal to a base current of the first transistor (Q0). The first correction circuit (12A) operates in response to the base current of the fifth transistor (Q7) to subtract a correction current equal to the base current of the first transistor (Q0) from a first current ($I_{VLoad}$) in the first conductor (4). A second correction circuit (12B) includes a sixth transistor (Q6) which has a base current equal to a base current of the second transistor (Q1). The second correction circuit (12B) operates in response to the base current of the sixth transistor (Q7) to subtract a correction current equal to the base current of the second transistor (Q1) from the first current ($I_{VLoad}$) in the first conductor (4).

In one embodiment, the first correction circuit (12A) includes a first operational amplifier (13A) with a first input (−) coupled to the base of the fifth transistor (Q7), an output (15A) operative to control the flow of the base current of the fifth transistor (Q7) in a first current mirror (MP3,2,10) wherein the first output (2,drain of MP2) of the first current mirror (MP3,2,10) supplies base current to the first transistor (Q0) to effectively add the correction current equal to the base current of the first transistor (Q0) into the second conductor (2), and a second input (+) coupled to the second conductor (2) and a first output (drain of MP2) of the first current mirror (MP3,2,10). A second output (drain of MP10) of the first current mirror (MP3,2,10) is coupled to control a second current mirror (MN5,6,9). A first output (drain of MN6) of the second current mirror (MN5,6,9) is coupled to subtract correction current equal to the base current of the first transistor (Q0) from the first current ($I_{VLoad}$) in the first conductor (4), and a second output (drain of MN9) of the second current mirror (MN5,6,9) is coupled to subtract correction current equal to the base current of the first transistor (Q0) from a second current ($I_{VLoad2}$) in a sixth conductor (11) connected to an emitter of the fifth transistor (Q7). The second correction circuit (12B) includes a second operational amplifier (13B) having a first input (−) coupled to the base of the sixth transistor (Q6), an output (15B) operative to control the flow of the base current of the sixth transistor (Q6) in a third current mirror (MP0,1,11), and a second input (+) coupled to the fourth conductor (3) and a first output (drain of MP1) of the third current mirror (MP0,1,11) wherein the first output (3,drain of MP1) of the third current mirror (MP0,1,11) supplies base current to the second transistor (Q1) to effectively add correction current equal to the base current of the second transistor (Q1) into the fourth conductor (3). A second output (drain of MP11) of the third current mirror (MP0,1,11) is coupled to control a fourth current mirror (MN8,7,10). A first output (drain of MN7) of the fourth current mirror (MN8,7,10) is coupled to subtract the correction current equal to the base current of the second transistor (Q1) from the first current ($I_{VLoad}$) in the first conductor (4). A second output (drain of MN10) of the fourth current mirror (MN8,7,10) is coupled to subtract the correction current equal to the base current of the second transistor (Q1) from the second current ($I_{VLoad2}$) in the sixth conductor (11), the sixth conductor (11) being connected to an emitter of the sixth transistor (Q6).

DETAILED DESCRIPTION OF THE PREFERRED EMBODIMENTS

Figure 1:
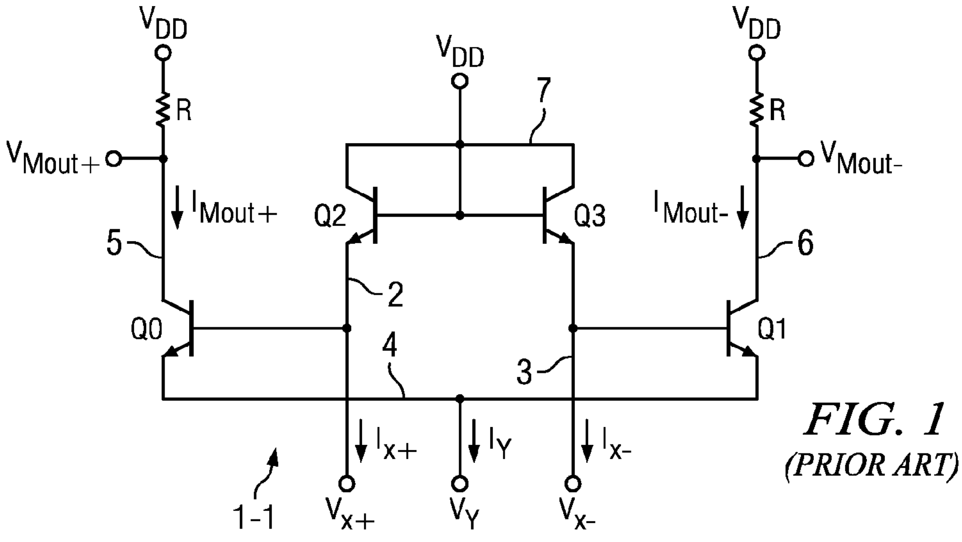
FIG. 1 (PRIOR ART)
FIG. 1 is a conventional translinear Gilbert multiplier circuit.
Figure 4:
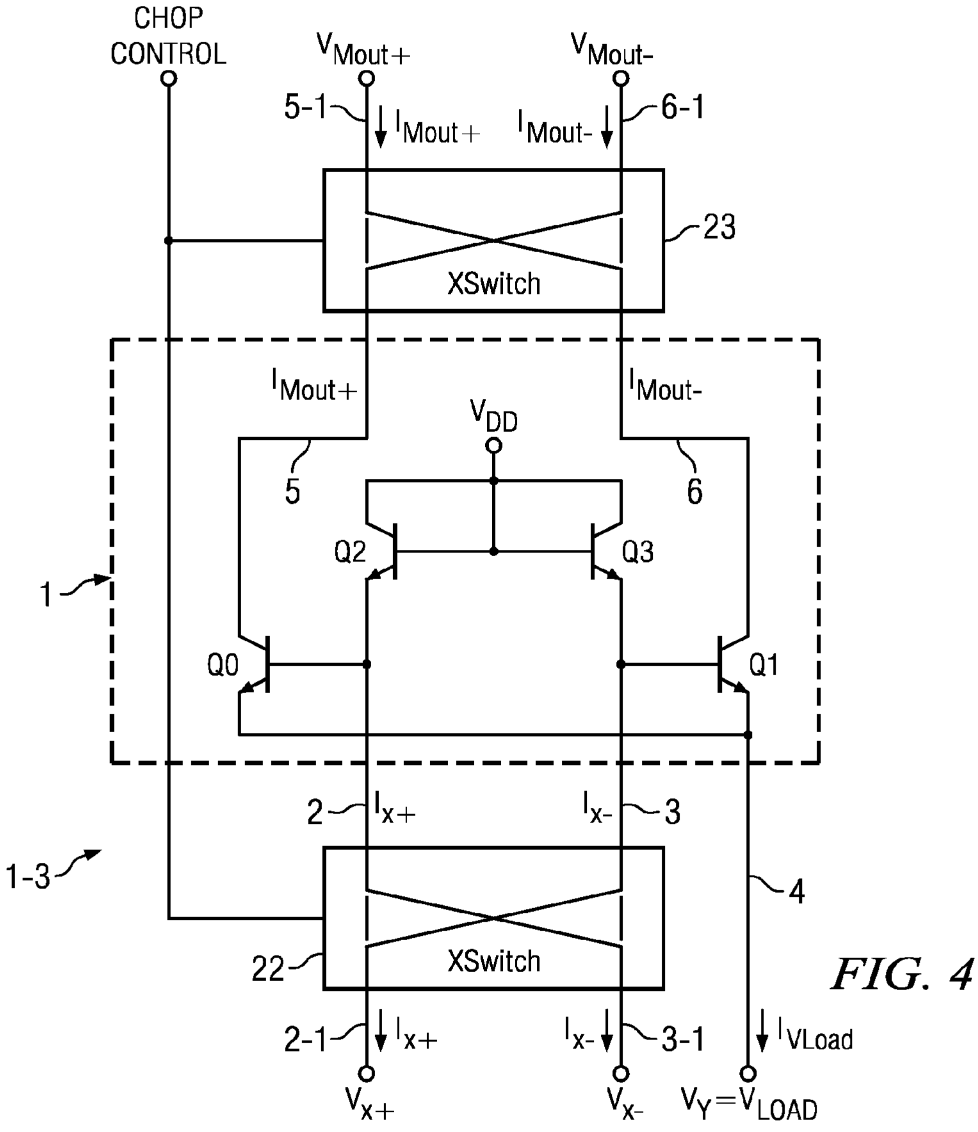
FIG. 4 is a block diagram of a chopped translinear Gilbert multiplier circuit.
Figure 2:
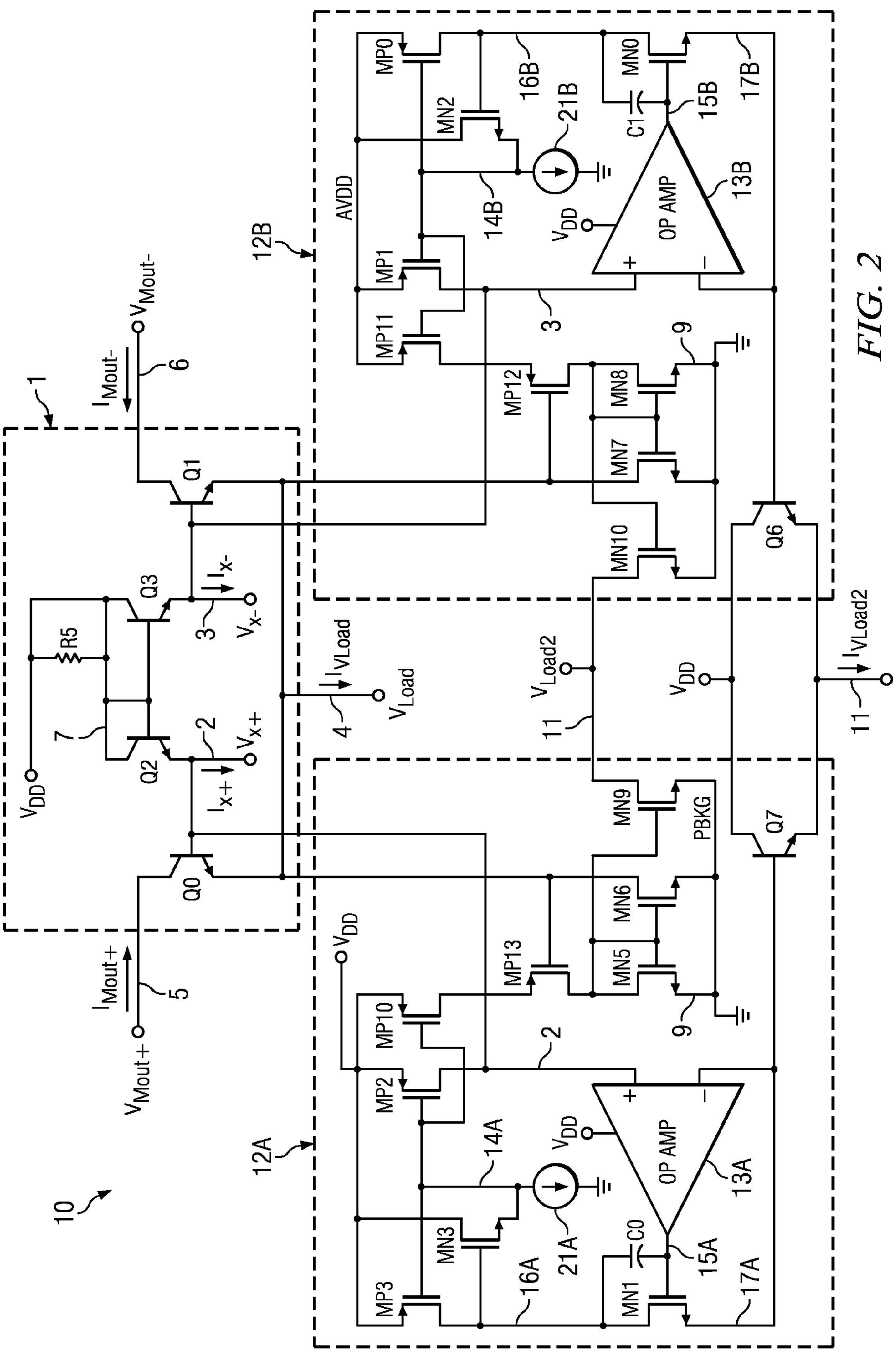
FIG. 2 is a schematic diagram including a translinear Gilbert multiplier and associated circuitry for correction of the effects of variations in base current in bipolar transistors in the translinear Gilbert multiplier circuit.
Figure 3:
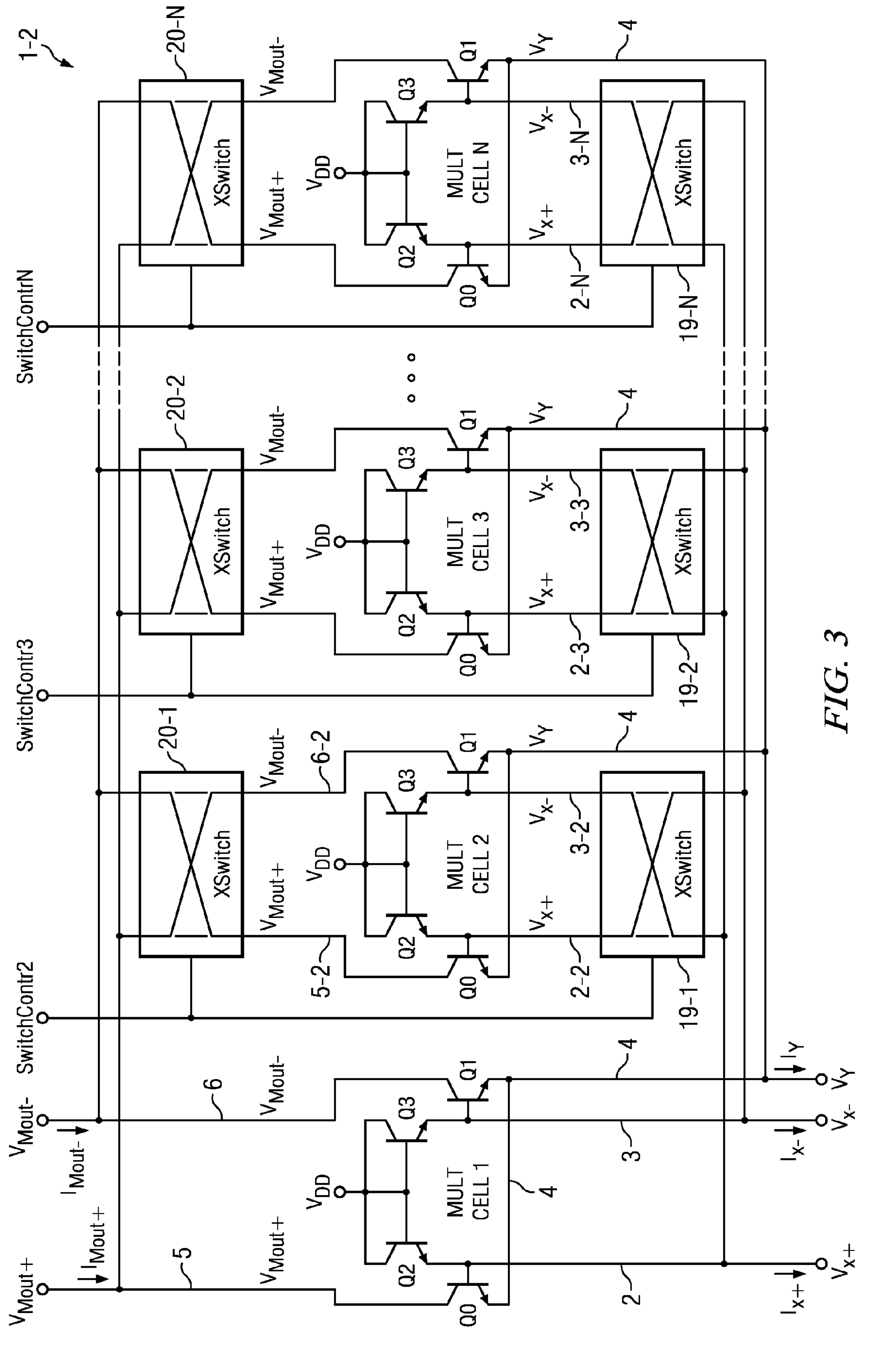
FIG. 3 is a schematic diagram of a segmented translinear Gilbert multiplier circuit.
Figure 11:
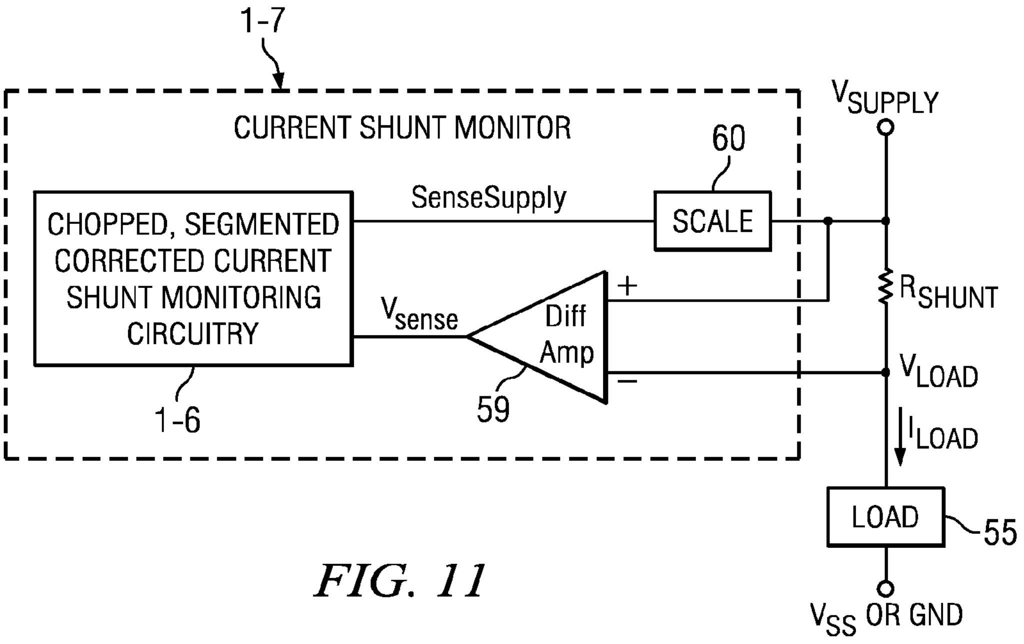
FIG. 11 is a simplified diagram of a current shunt circuit included in a current shunt monitor.

FIG. 2 shows a base current corrected multiplier circuit 10 that includes a translinear Gilbert multiplier 1 (as shown in FIG. 1) along with base current correction circuits 12A and 12B which each include correction circuitry that corrects for variations in the transistor base current $I_b$, and hence for variations in the current gain β. (It should be appreciated that correcting for variation in the transistor base current $I_b$ is equivalent to correcting its current gain β.) In translinear Gilbert multiplier 1 (hereinafter, simply "multiplier 1"), a resistor R5 is connected between conductor 7 and $V_{DD}$ for the purpose of providing voltage "head room" so as to avoid any saturation of transistors Q0 and Q1. Resistor R5 therefore functions as a voltage level shifter. Conductor 4 connects the emitters of transistors Q0 and Q1 to correction circuits 12A and 12B. A current $I_{VLoad}$ flows out of conductor 4 and is a scaled representation of the voltage across a load 55 (FIG. 11). The voltage of conductor 4 is $V_{Load}$. As subsequently explained, translinear Gilbert multiplier 1 may be chopped as shown in FIG. 4 and/or segmented as shown in FIG. 3.

At this point, it will be helpful to show how a translinear Gilbert multiplier may be utilized in a current shunt monitor circuit 1-7 generally as shown in FIG. 11. FIG. 11 shows a simplified diagram of a current shunt monitor 1-7 which includes current shunt monitoring circuitry 1-6 of subsequently described FIGS. 7-1 and 7-2. Current shunt monitoring circuitry 1-7 is coupled to one terminal of a load 55 and one terminal of a current shunt resistor $R_{SHUNT}$, the other terminal of which is connected to an external supply voltage $V_{SUPPLY}$. $V_{Load}$ is the voltage produced on the lower terminal of $R_{SHUNT}$ and on the (−) input of differential amplifier 59 as a result of the load current $I_{Load}$ flowing from $V_{SUPPLY}$ to ground through $R_{SHUNT}$ and load 55. The (+) input of differential, amplifier 59 is connected to $V_{SUPPLY}$. $V_{SUPPLY}$ is scaled down by means of a scaling circuit 60 to generate the signal SenseSupply utilized in FIG. 7-1. Differential amplifier 59 generates the voltage applied to circuit 47 in FIG. 7-2. $I_{VLoad}$ in FIG. 2 is a scaled-down representation of the load voltage $V_{Load}$, and therefore also is a representation of $V_{Load}$ in FIG. 2. $I_{VLoad}$ and $I_{VLoad2}$ in FIG. 2 are equal, and therefore the base-emitter voltages generated on matched transistors Q0 and Q1, and also the base-emitter voltages of transistors Q7 and Q6 are equal.

Referring again to FIG. 2, correction circuit 12A includes a P-channel transistor MP13 having its gate connected to conductor 4 and the drain of a N-channel transistor MN6. The drain of transistor MP13 is connected to the gates of N-channel transistors MN5, MN6, and MN9, the sources of which are connected ground. The drain of transistor MN6 is connected to conductor 4. The drain of transistor MP13 also is connected to the drain of transistor MN5. The drain of transistor MN9 is connected to a conductor 11 into which a base current correction to current $I_{VLoad2}$ flows. The source of transistor MP13 is connected to the drain of a P-channel transistor MP10, the source of which is connected to $V_{DD}$. The gate of transistor MP10 is connected by conductor 14A to the gate of a P-channel transistor MP2, the gate of P-channel transistor MP3, the source of a N-channel transistor MN3, and a current source 21A which is referenced to ground. The sources of transistors MP2 and MP3 are connected to $V_{DD}$. The drain of transistor MP2 is connected to the (+) input of amplifier 13A. The drain of transistor MP2 supplies base current to transistor Q0 to, in effect, add a correction current equal to the base current of transistor Q0 into conductor 2 so that the $I_{X+}$ current is corrected for error caused by the base current of transistor Q0. Note that the base current of transistor Q0 causes two kinds of error in translinear Gilbert multiplier 1. The first kind of error is caused by the fact that the base current of transistor Q0 is diverted from the $I_{X+}$ current in conductor 2, and the second kind of error is caused by the fact that the base current of transistor Q0 is actually a component of its emitter current and therefore is added into $I_{VLoad}$. Base current correction circuit 12A corrects for both kinds of error. The first kind of error is corrected by the base current replica generated in transistor MP2, and the second kind of error is corrected by the base current replica generated in transistor MN6. The drain of transistor MN3 is connected to $V_{DD}$. The drain of transistor MP3 is connected to the gate of transistor MN3, one plate of a compensation capacitor C0, and the drain of a N-channel transistor MN1. The gate of transistor MN1 is connected by conductor 15A to the output of amplifier 13A and the other plate of capacitor C0. The source of transistor MN1 is connected by conductor 17A to the (−) input of amplifier 13A and the base of a NPN transistor Q7. The collector of transistor Q7 is connected to $V_{DD}$, and its emitter is connected to conductor 11.

Similarly, correction circuit 12B includes a P-channel transistor MP12 having its gate connected to conductor 4 and the drain of a N-channel transistor MN7. The drain of transistor MP12 is connected to the gates of N-channel transistors MN10, MN7, and MN8, the sources of which are connected to ground. The drain of transistor MP12 also is connected to the drain of transistor MN8. The drain of transistor MN 10 is connected to a conductor 11 into which a base current correction to $I_{VLoad2}$ flows. The source of transistor MP12 is connected to the drain of a P-channel transistor MP11, the source of which is connected to $V_{DD}$. The gate of transistor MP11 is connected by conductor 14B to the gate of a P-channel transistor MP1, the gate of P-channel transistor MP0, the source of a N-channel transistor MN2, and a current source 21B which is referenced to ground. The sources of transistors MP1 and MP0 are connected to $V_{DD}$. The drain of transistor MP1 is connected to the (+) input of amplifier 13B. The drain of transistor MP1 supplies base current to transistor Q1 to, in effect, add a correction current equal to the base current of the second transistor Q1 into conductor 3 so that the $I_{X-}$ current is corrected for error caused by the base current of Q1. Again, the base current of Q1 causes two kinds of error, the first kind being caused by the fact that the base current of transistor Q1 is diverted from $I_{X-}$, and the second kind being caused by the fact that the base current of transistor Q1 is a component of its emitter current and therefore is added into $I_{VLoad}$. Base current correction circuit 12B corrects for both kinds of error. The first kind of error is corrected by means of transistor MP1, and the second kind of error is corrected by means of transistor MN7. The drain of transistor MN2 is connected to $V_{DD}$. The drain of transistor MP0 is connected to the gate of transistor MN2, one plate of a compensation capacitor C1, and the drain of a N-channel transistor MN0. The gate of transistor MN0 is connected by conductor 15B to the output of amplifier 13B and the other plate of capacitor C1. The source of transistor MN0 is connected by conductor 17B to the (−) input of amplifier 13B and the base of a NPN transistor Q6. The collector of transistor Q6 may be connected to $V_{DD}$, and its emitter is connected to conductor 11. The base current correction to $I_{VLoad2}$ flows out of the emitters of transistors Q6 and Q7 and into the drains of transistors MN7 and MN10 through conductor 11. (Note that in some cases the collectors of transistors Q7 and Q6 could be advantageously connected to conductor 7 instead of $V_{DD}$.)

Transistors Q7 and Q6 are arranged so as to precisely "mimic" the operation of transistors Q0 and Q1, respectively, such that the base currents of transistors Q7 and Q6 are identical to the base currents of multiplier transistors Q0 and Q1, respectively. The base currents of transistors Q7 and Q6 are mirrored, and the mirrored base currents are appropriately added to and subtracted from various conductors, as subsequently explained, so as to correct for the errors which are caused by the base currents of transistors Q0 and Q1 and by the limited β of the transistors in multiplier 1. (However, the circuit of FIG. 2 does not compensate for errors due to transistor mismatching in multiplier 1.) More specifically, the base current component errors in the emitter currents through transistors Q7 and Q6 are corrected by providing the base current replicas generated in the drains of transistors MN6 and MN7, and the emitter currents flowing through transistors Q2 and Q3 are corrected by providing the base current replicas generated in the drains of transistors MP2 and MP1, respectively.

Figures 1, 7:
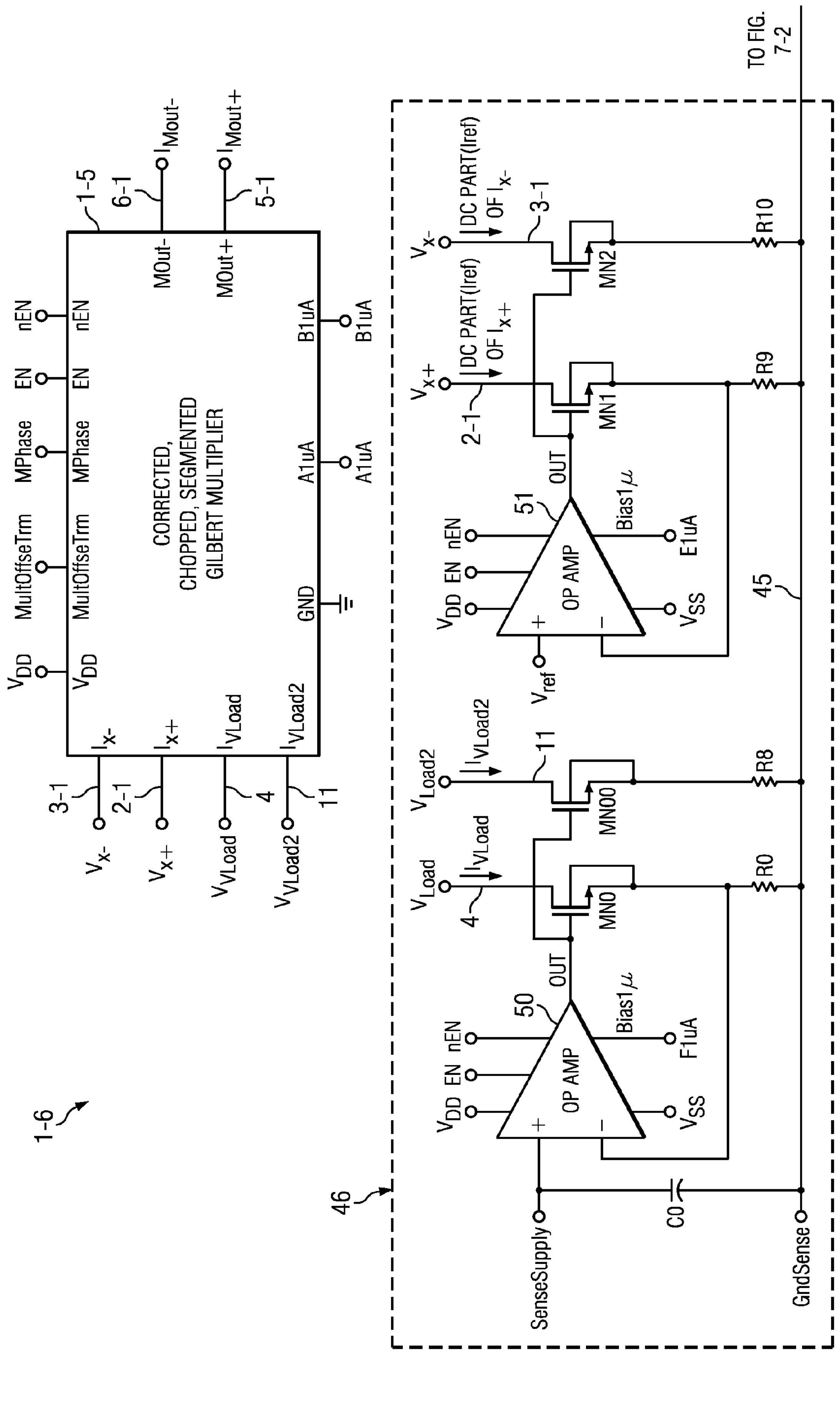
FIG. 7 is a schematic diagram of a current shunt monitor circuit including the translinear Gilbert multiplier of FIG. 6 and circuitry for generating input signals of the translinear Gilbert multiplier and for determining the amount of power delivered to a load by subtracting power dissipated in a shunt resistor from total power delivered to the shunt resistor and load together.
Figures 2, 7:
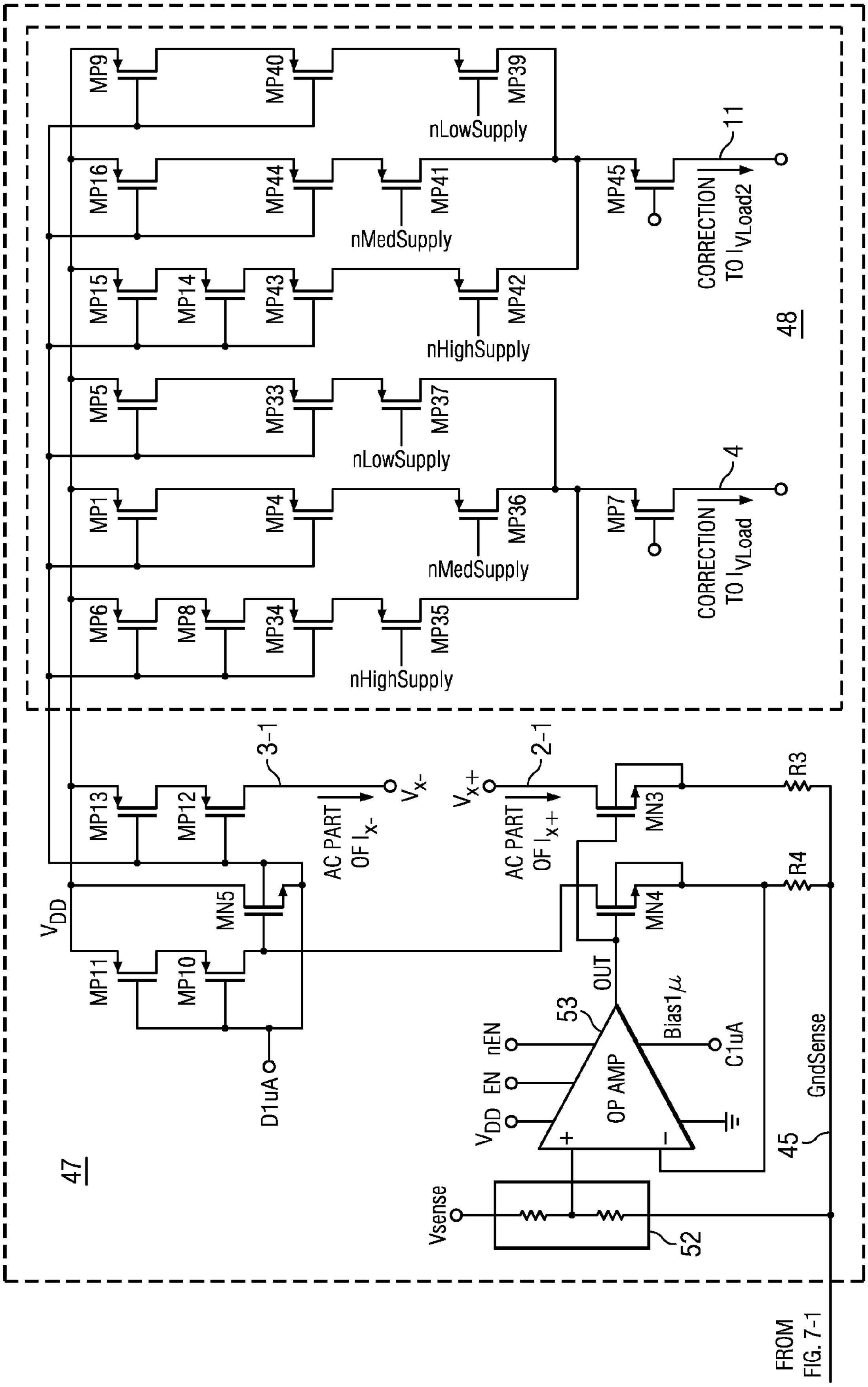

The multiplier function performed by multiplier 1 can multiply a shunt current input by a supply voltage input ($V_{SUPPLY}$ in FIG. 11) to provide an output that represents the power supplied to a load. The load voltage input $V_{Load}$ is nearly equal to the supply voltage $V_{SUPPLY}$, which is represented by the scaled-down voltage SenseSupply (FIGS. 7-1 and 11). $V_{Load}$ generates the identical multiplier inputs $I_{VLoad}$ and $I_{VLoad2}$. The load current $I_{Load}$ develops a small voltage across $R_{SHUNT}$ (FIG. 11) which is scaled by differential amplifier 59 to provide Vsense, which generates the differential current $I_{X+}-I_{X-}$ that represents the load current and provides an input to the multiplier.

The power measurement output generated by multiplier 1 is represented by either of the differential multiplier output current $I_{MOut+}-I_{MOut-}$ or the corresponding differential multiplier output voltage $V_{Mout+}-V_{Mout-}$ generated by multiplier 1. (The differential multiplier output voltage $V_{Mout+}-V_{Mout-}$ is developed across a pair of load resistors, such as resistors R shown in Prior Art FIG. 1.)

The geometry of transistor Q7 in FIG. 2 is precisely matched to the geometry of transistor Q0. Transistor Q7 is biased in such a way that its base and emitter voltages precisely match the base and emitter voltages, respectively, of transistor Q0. The collector voltage of transistor Q0 on conductor 5 may be slightly different than the voltage $V_{DD}$ on the collector of transistor Q7 through which the multiplier output current $I_{MOut+}$ flows, but the difference would have a negligible effect on matching of the respective base, emitter, and collector currents of transistors Q7 and Q0. $I_{VLoad}$ and $I_{VLoad2}$ are identical currents which are generated externally (see FIGS. 7-1, 7-2, and 11) and provided as inputs to translinear Gilbert multiplier circuit 1 shown in FIG. 2. Under these conditions, the respective base current, emitter current, and collector current of transistors Q7 and Q0 also are precisely matched. Similarly, the geometry of transistor Q6 is precisely matched to the geometry of transistor Q1, and transistor Q6 is biased in such a way that its base and emitter voltages precisely match the base and emitter voltages, respectively, of transistor Q1.

In correction circuit 12A, the base current of transistor Q7 flows through conductor 17A, transistor MN1 and through current mirror input transistor MP3, and therefore is mirrored through current mirror output transistors MP2 and MP10. The drain voltage $V_{X+}$ of transistor MP2 is connected by conductor 2 to the (+) input of operational amplifier 13A and also to the base of transistor Q0 in translinear Gilbert multiplier 1. The output 15A of amplifier 13A is connected to the gate of transistor MN1, the source of which provides feedback to the (−) input of amplifier 13A. This causes the base voltage of transistor Q7 to be precisely equal to the base voltage of transistor Q0, on conductor 2. In other words, the base current of transistor Q0 is precisely replicated as the base current of transistor Q7. Thus, transistor MP2 mirrors the base current of transistor Q7, and the feedback loop of operational amplifier 13A and associated current mirror circuitry in block 12A of FIG. 2 cooperate to force the base voltages of transistors Q0 and Q7 to be equal. Therefore, all of the externally supplied current $I_{X+}$ current flows through transistor Q2 and none of it is diverted into the base of transistor Q0. The reason the emitter voltages of transistors Q7 and Q0 are equal is that their base voltages are equal and the external currents $I_{VLoad}$ and $I_{VLoad2}$ being drawn by the transistors MN0 and MN00 in subsequently described FIG. 7-1 are equal. Note that $I_{VLoad2}$ is simply an essentially identical replica of $I_{VLoad}$.

Similarly, the voltage $V_{X-}$ on conductor 3 in FIG. 2 (conductor 3-1 in FIG. 7-1) is replicated on the base of transistor Q6, and the differential transistor pair Q6 and Q7 sees essentially the same differential voltage seen by transistors Q1 and Q0. As previously mentioned, $I_{VLoad}$ is a scaled-down representation $V_{Load}$. $I_{VLoad}$ and $I_{VLoad2}$ are equal, and therefore the base-emitter voltages generated on transistors Q0 and Q1, and also the base-emitter voltages of transistors Q7 and Q6 are equal. Therefore, the sum of the emitter currents of transistors Q6 and Q7 is equal to the sum of the emitter currents of transistors Q0 and Q1. The differential voltage between transistors Q0 and Q1 and the corresponding differential voltage between transistors Q7 and Q6 are equal.

The reason it is desirable for all of the $I_{X+}$ current and all of the $I_{X-}$ current to flow through transistors Q2 and Q3, respectively, is that the applicable translinear Gilbert multiplier equations are based on the exponential nature of a bipolar transistor PN junction, and the resulting differential voltage based on the differential input current $I_{X+}-I_{X-}$ is equal to the logarithm of that differential current. Multiplication is achieved by applying that voltage (i.e., the logarithm of the ratio of $I_{X+}$ to $I_{X-}$, which corresponds to the differential voltage between conductors 2 and 3) across the two "exponential" emitter-base junctions and by, in effect, taking the logarithm of the differential current and the logarithm of $I_{VLoad}$ in transistors Q0 and Q1 adding those two logarithms together, and generating an exponential value in the differential output current $I_{Mout+}-I_{Mout-}$ in the collectors of transistors Q0 and Q1. If the base currents of transistors Q0 and Q1 are canceled or are supplied by transistor MP2 or transistor MP1, then all of currents $I_{X+}$ and $I_{X-}$ go through the emitter-base junctions of transistors Q2 and Q3, respectively, and a "pure" logarithm of the differential current is, in effect, generated. However, if some of $I_{X+}$ and $I_{X-}$ is lost in the form of base current into transistors Q0 and Q1, that results in an error in the differential output current $I_{Mout+}-I_{Mout-}$ in the collectors of transistors Q0 and Q1.

The base current of transistor Q0 appears as part of its emitter current, which becomes part of $I_{VLoad}$. Consequently, the base current of transistor Q0 produces an error component in $I_{VLoad}$, and similarly, the base current of transistor Q7 appears as part of its emitter current, which becomes part of $I_{VLoad2}$ and produces an error component in $I_{VLoad2}$. The mirrored replica of the base current of transistor Q0 produced in current mirror output transistor MP10 flows through transistor MP13 into another current mirror including transistors MN5, MN6, and MN9. That mirrored current is again mirrored so as to flow through transistor MN6, which in effect subtracts the base current of transistor Q0 from $I_{VLoad}$ in conductor 4 so it does not affect $I_{VLoad}$. The error in $I_{VLoad}$ due to the base current of transistor Q0 is thereby eliminated. Similarly, the mirrored base current replica current flowing through transistor MN9 in effect subtracts the base current of transistor Q0 from $I_{VLoad2}$ and eliminates the corresponding error in $I_{VLoad2}$ due to the base current of Q0 or Q7.

The description of the operation of correction circuit 12B is entirely similar to the operation of correction circuit 12A, and therefore is not repeated.

Referring to FIG. 3, segmented translinear Gilbert multiplier 1-2 includes N essentially identical multiplier sub-cells sharing $V_{X+}$, $V_{X-}$ and $V_Y$ input conductors such as conductors 2, 3, and 4, respectively, and also selectively sharing $V_{Mout+}$ and $V_{Mout-}$ output conductors 5 and 6, respectively. Multiplier Cell 1 has its $V_{X+}$, $V_{X-}$ and $V_Y$ input conductors 2-2, 3-2 and 4, respectively, connected directly to corresponding conductors 2, 3, and 4 of segmented multiplier 1-2. Multiplier Cell 1 also has its output conductors 5-2 and 6-2 connected directly as the $V_{Mout+}$ and $V_{Mout-}$ output conductors of segmented multiplier 1-2. Multiplier Cell 2 has its $V_{X+}$ and $V_{X-}$ conductors 2-2 and 3-2 selectively coupled by a conventional cross switch circuit or "X switch" circuit 19-1 to the $V_{X+}$ and $V_{X-}$ conductors 2 and 3, respectively, or vice versa of segmented multiplier 1-2. (A typical X switch is shown in Prior Art FIG. 9.) Multiplier Cell 2 also has its $V_Y$ conductor 4 connected directly to the $V_Y$ conductor 4 of segmented multiplier 1-2. Multiplier Cell 2 also has its $V_{Mout+}$ and $V_{Mout-}$ output conductors 5-2 and 6-2 selectively coupled by an X switch circuit 20-1 to the $V_{Mout+}$ and $V_{Mout-}$ output conductors 5 and 6, respectively, or vice versa of segmented multiplier 1-2. Multiplier Cells 3, 4 . . . N are similarly coupled to the corresponding $V_{X+}$, $V_{X-}$, and $V_Y$ conductors 2, 3, and 4, respectively, of segmented multiplier 1-2 and to the corresponding $V_{Mout+}$ and $V_{Mout-}$ output conductors 5 and 6, respectively of segmented multiplier 1-2.

Switching control signals SwitchContr2, SwitchContr3, . . . and SwitchContrN control switching of the X switches such that the various "internal" $V_{Mout+}$ and $V_{Mout-}$ terminals of the various additional switchable Multiplier Cells 2, 3 . . . and N are selectively connected to output conductors 5 and 6, respectively, or vice versa. The various "internal" $I_{X+}$ and $I_{X-}$ terminals of the switchable Multiplier Cells 2, 3 . . . and N are selectively connected to input conductors 2 and 3, respectively, or vice versa in such a way as to minimize the overall net input offset voltage of segmented multiplier 1-2. The switching may be accomplished during manufacture by measuring the input offset voltage of each of Multiplier Cell 1, Multiplier Cell 2, . . . Multiplier Cell N and blowing appropriate fuses (not shown) to generate the above-mentioned control signal so as to accomplish the desired connections between them and input conductors 2 and 3 and output conductors 5 and 6.

The foregoing segmenting reduces the overall net input offset voltage of segmented multiplier 1-2 due to inherent mismatches associated with the various Q0, Q1, Q2, and Q3 transistors by dividing multiplier 1-2 into smaller, symmetrical, parallel-coupled multiplier cells and then arranging them by means of the various X switches and switching control signals so as to decrease the overall input offset voltage. The separate parallel-coupled multiplier cells operate individually and provide opposite-polarity contributions to an averaged composite output signal having a substantially decreased input-referred offset.

Referring to FIG. 4, chopped, segmented translinear Gilbert multiplier 1-3 includes multiplier 1 as shown in Prior Art FIG. 1 or segmented multiplier 1-2 as shown in FIG. 3, and also includes a pair of X switches 22 and 23 each controlled by a chopping control signal CHOP CONTROL. X switch 22 alternately couples the $V_{X+}$ and $V_{X-}$ input conductors 2 and 3, respectively, of segmented multiplier 1-2 to the $V_{X+}$ and $V_{X-}$ input conductors 2-1 and 3-1, respectively, of multiplier 1-3 at a rate equal to the frequency of CHOP CONTROL. The $V_Y$ input conductor 4 of multiplier 1 is directly connected to the $V_Y$ input conductor of multiplier 1-3. X switch 23 alternately couples the $V_{Mout+}$ and $V_{Mout-}$ output conductors 5 and 6, respectively, of multiplier 1 to the $V_{Mout+}$ and $V_{Mout-}$ output conductors 2-1 and 3-1, respectively, of chopped, segmented translinear Gilbert multiplier 1-3, in response to CHOP CONTROL.

Figure 9:
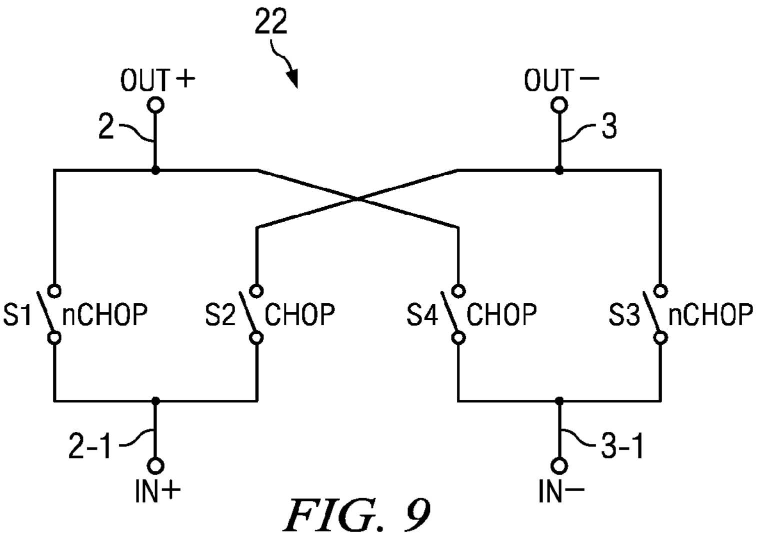
FIG. 9 (PRIOR ART)
FIG. 9 is a simplified diagram of an X switch in FIG. 5.

Basically, the chopping of multiplier circuit 1-3 in FIG. 4 is achieved by operating X switches 22 and 23 so as to simultaneously invert both the external $V_{X+}$ and $V_{X-}$ signals relative to the corresponding internal signals on conductors 2 and 3, respectively, and also to simultaneously invert the $V_{Mout+}$ and $V_{Mout-}$ external output signals relative to the corresponding internal signals on conductors 5 and 6, respectively. The external output signals $V_{Mout+}$ and $V_{Mout-}$ then are averaged over time to effectively eliminate the input-referred DC input offset voltages. FIG. 9 shows a simplified diagram of a X switch.

Figure 6:
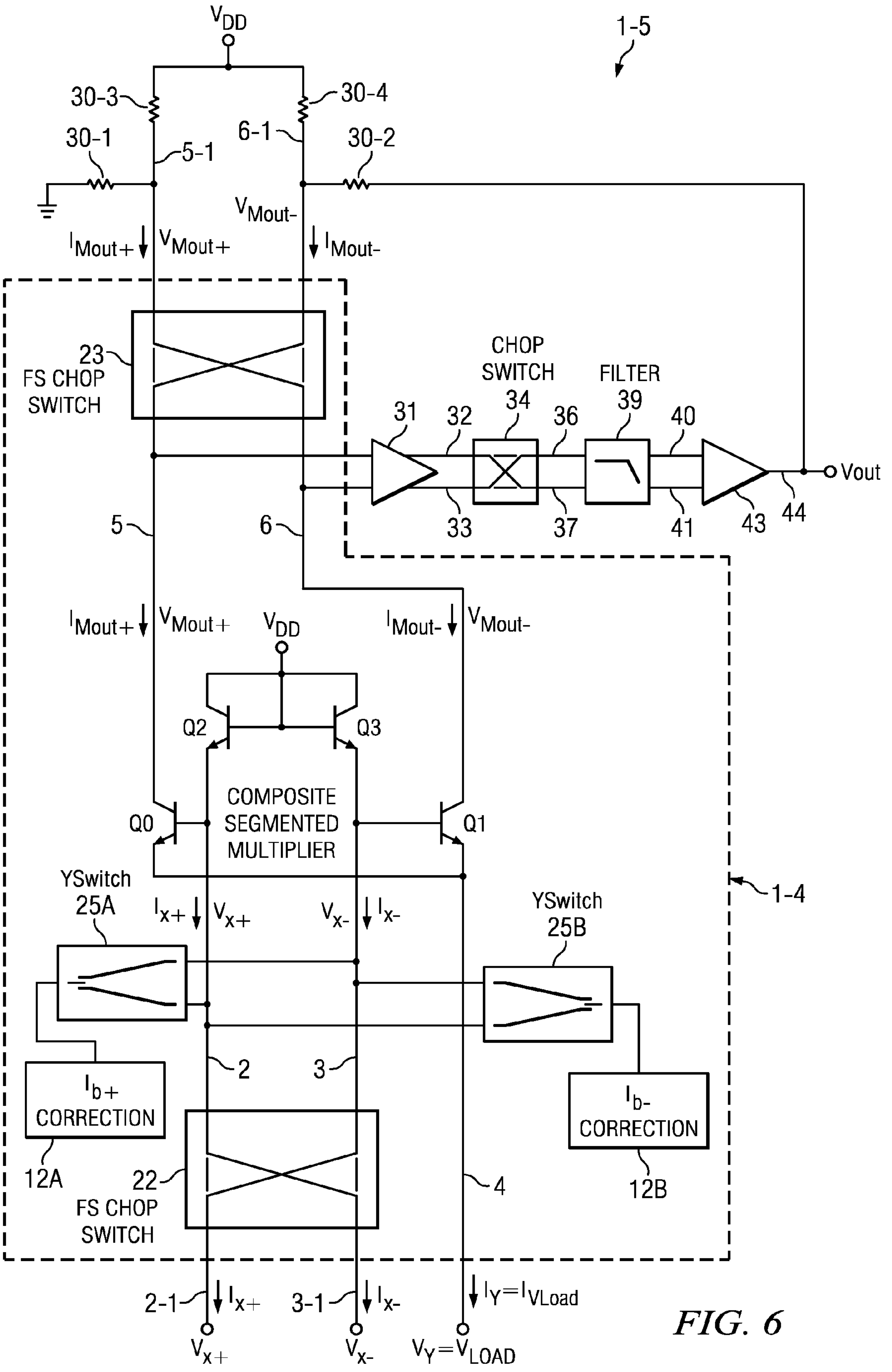
FIG. 6 is a schematic diagram of a complete chopped, corrected, and segmented translinear Gilbert multiplier circuit including a chopped output buffer circuit.

The emitters of transistors Q2 and Q3 provide very low impedance drive to charge the capacitances of conductors 2 and 3, respectively, so chopping noise signals on those conductors settle very rapidly. The output of the translinear Gilbert multiplier, for example as shown in FIG. 6, and any associated feedback network, for example as also shown in FIG. 6, has no substantial effect on the fast settling of the emitter voltages of transistors Q2 and Q3.

In FIG. 4, X switch 22 alternately applies each of the signals on 2-1 and 3-1 back and forth between conductors 2 and 3. If there is a significant difference between the currents and $I_{X-}$ through conductors 2-1 and 3-1, a substantial $V_{BE}$ difference, i.e., several hundred millivolts, is generated between the bases of transistors Q2 and Q3 to support those significantly different currents. Therefore, the chopping/swapping of the $V_{X+}$ and $V_{X-}$ inputs, in effect, causes the emitter voltages of transistors Q2 and Q3 to be swapped.

The low impedance emitters of the bipolar transistors in multiplier 1-2 of FIG. 4 allows associated parasitic capacitances to be charged and discharged rapidly. Therefore, even when the multiplier is operated with significantly large differential voltages between the bases of transistors Q0 and Q1, fast settling of chopping-induced voltages on conductors 2 and 3 of multiplier 1 is achieved during chopping of the $V_{X+}$ and $V_{X-}$ inputs 2-1 and 3-1 of multiplier 1-3.

It should be appreciated that to achieve successful chopping of a current mode signal, four sensing switches should be used, or else the resistance of the switches must be reduced enough that the IR voltage drop across the switches is negligible. The Y switches 25A and 25B in FIG. 5 can be used as the four sensing switches.

Figure 5:
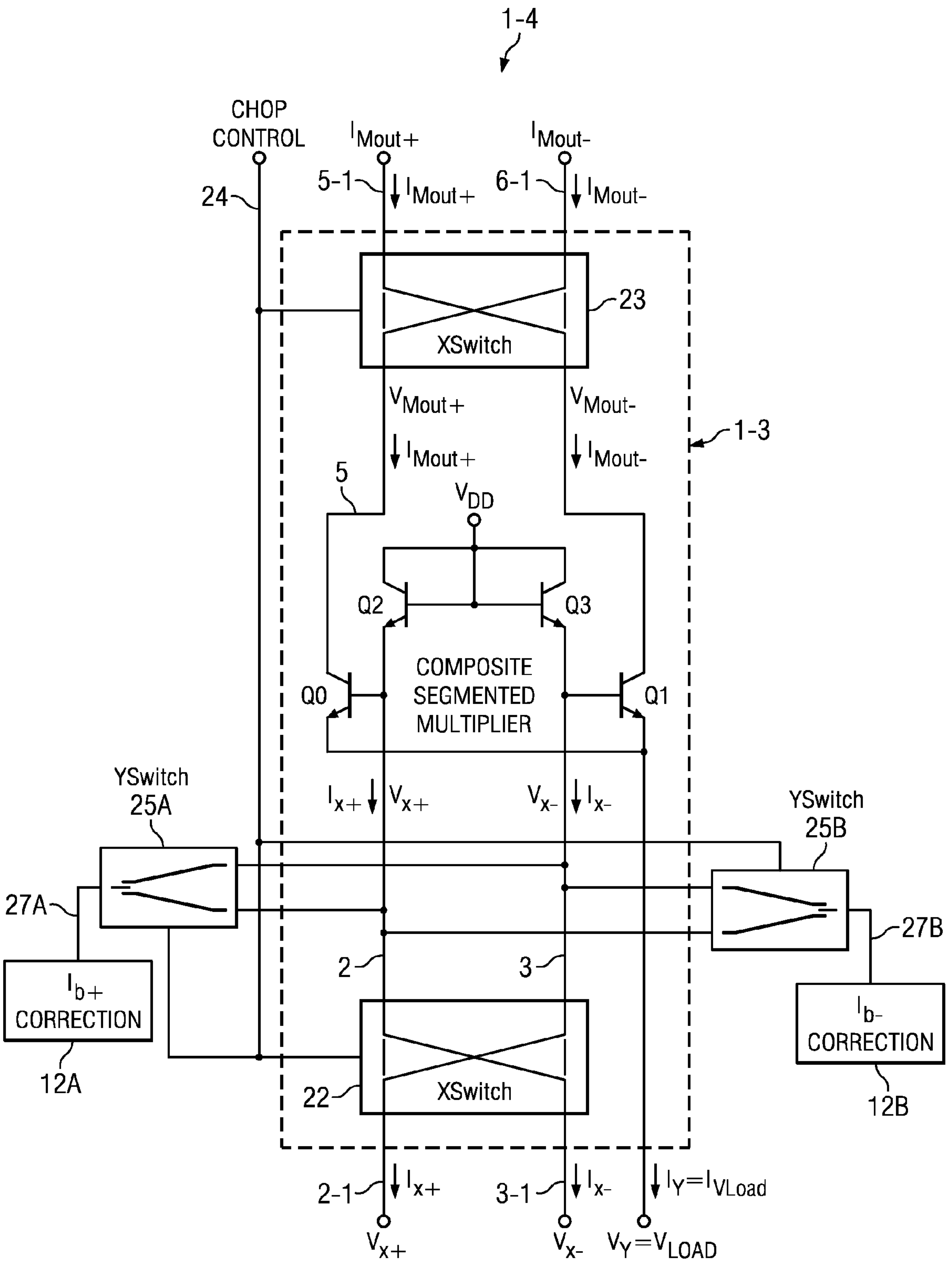
FIG. 5 is a schematic diagram of a base current corrected chopped and segmented translinear Gilbert multiplier circuit.
Figure 10:
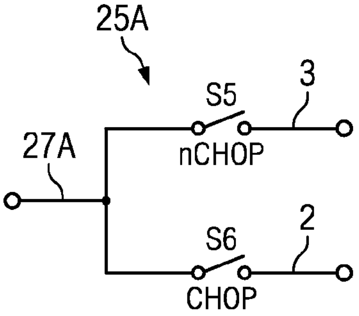
FIG. 10 (PRIOR ART)
FIG. 10 is a simplified diagram of a Y switch in FIG. 5.

Referring to FIG. 5, a base current corrected, chopped, segmented translinear Gilbert multiplier 1-4 includes the multiplier 1-3 of FIG. 4 and further includes a base current or correction circuit 12A (as in FIG. 2) coupled by a conductor 27A to the output of a Y switch circuit 25A. (Prior Art FIG. 10 shows a simple Y switch circuit.) The inputs of Y switch circuit 25A are connected to the $V_{X+}$ conductor 2 and the $V_{X-}$ conductor 3, respectively, of multiplier 1-3. The switching of Y switch circuit 25A is controlled by the CHOP CONTROL signal on conductor 24. Similarly, multiplier 1-4 also includes a base current or $I_b$-correction circuit 12B coupled by a conductor 27B to the output of a Y switch circuit 25B. The inputs of Y switch circuit 25B are connected to the $V_{X+}$ conductor 2 and the $V_{X-}$ conductor 3, respectively, of chopped, segmented translinear Gilbert multiplier 1-3. The switching of Y switch circuit 25B also is controlled by CHOP CONTROL.

Previously described FIG. 4 shows a completely valid way of chopping the input and output a the Gilbert multiplier if the inputs and outputs are truly current mode signals, in that case, the circuitry shown in FIG. 4 is all that is necessary. However, if the base current correction circuits 12A and 12B of FIG. 5 are used, then it is necessary to provide precisely the same voltage to the bases of the correction transistors Q6 and Q7 as to the bases of transistors Q0 and Q1 in multiplier 1-3, accurate to within about a millivolt or less. Otherwise, the base-to-emitter voltages of transistors Q6 and Q7 will not be precisely matched to those of transistors Q0 and Q1, respectively, and their respective base currents also will not be precisely matched.

Part of the correction circuit 12A in FIGS. 2 and 5 senses the voltage on conductor 2 at the base of transistor Q0. Conductor 2 is connected to an input of an operational amplifier which forces the base of transistor Q6 to exactly mimic the base of transistor Q0. The base voltage of transistor Q0 on conductor 2-1 might be a few millivolts different than the voltage on conductor 2, because of the resistance of the X switch and the current going through it. Either a very large switch with a very low ON resistance would be needed, or it would be necessary to perform base voltage sensing on conductor 2 instead of conductor 2-1 on the opposite side of X switch 22. It would be much easier to sense the base voltages on conductors 2-1 and 3-1 because the voltages on those conductors are continuous, not chopped or switched. Unfortunately, the voltages on conductors 2-1 and 3-1 usually are offset by as much as a few millivolts or more. Consequently, chopping may be necessary, in which case conductors 2 and 3 are in effect swapped by X switch 22. Therefore, the "un-chopped" signals on conductors 27A and 27B must be provided by operating Y switches 25A and 25B so that the $V_{X+}$ signal on conductor 2-1 always is applied to correction circuit 12A and so that the $V_{X-}$ signal on conductor 3-1 always is applied to correction circuit 12B irrespective of the chopping operation of X switch 22. (A simplified diagram of a Y switch is shown in FIG. 10.)

During one chopping phase, the base voltage of transistor Q0 is fed through Y switch 25A to the $I_{b+}$ correction circuit 12A. Then, when all of the "X" chopping switches change phase, the base voltage of transistor Q0 is fed through Y switch 25B to the $I_{b-}$ correction circuit 12B. The Y switches 25A are synchronized to the X switches 25B and sense the voltages at the bases of transistors Q1 and Q0 (instead of sensing the corresponding voltages on conductors 2-1 and 3-1 below X switch 22). Since output of multiplier 1-4 of FIG. 5 is a differential current, either a current amplifier is needed to obtain a usable corresponding output signal, or the corresponding differential output voltage $V_{Mout+}-V_{Mout-}$ between conductors 5 and 6 must be converted to a voltage that can be applied to the input of a buffer amplifier to provide a usable output voltage.

Referring to FIG. 6, a base current corrected, chopped, segmented translinear Gilbert multiplier 1-5 includes multiplier 1-4 of FIG. 5, and further includes an output stage including an input amplifier 31 having its inputs connected to conductors 5 and 6, respectively, and having its outputs 32 and 33 coupled to corresponding inputs of chopping switch circuit 34. The outputs 32 and 33 of amplifier 31 are provided as inputs to a low pass filter 39. The input chopping for amplifier 31 is accomplished by chopping switch circuit 22. The outputs 40 and 41 of filter 39 are connected to corresponding inputs of a amplifier 43, which produces an output signal Vout on conductor 44.

Conductor 44 also is connected to a feedback network including resistors 30-1, 30-2, 30-3, and 30-4, which help scale and convert the chopped differential multiplier output current $I_{Mout+}-I_{Mout-}$ (and differential output voltage $V_{Mout+}-V_{Mout-}$) into a single-ended voltage output without adding error to the signal. One terminal of resistor 30-2 is connected to output conductor 44, and its other terminal is connected by conductor 6-1 to the $I_{Mout-}$ terminal of multiplier 1-4 and to one terminal of resistor 30-4, the other terminal of which is connected to $V_{DD}$. The $I_{Mout+}$ terminal of multiplier 1-4 is connected to one terminal of each of resistors 30-1 and 30-3. The other terminal of resistor 30-1 is coupled to ground (or any other suitable reference voltage) and the other terminal of resistor 30-3 is connected to $V_{DD}$. The resistor network at the top of the FIG. 6 is outside of the chopping network that includes chopping switch circuits 22, 23, and 34. $I_{X+}$ and $I_{X-}$ are continuous signals which are chopped in multiplier 1-4, the output $I_{Mout+}-I_{Mout-}$ of which is un-chopped to generate a continuous signal going to the resistor network including resistors 30-1,2,3,4.

FIG. 7 includes sections 7-1 and 7-2, which together show a detailed schematic of part of a current shunt monitor 1-7 including current shunt monitoring circuitry 1-6 operating to generate various inputs to analog multiplier 1-5 of FIG. 6, which includes the base current correction circuitry shown in FIG. 2. Current shunt monitoring circuitry 1-6 may be connected to external current shunt resistor $R_{SHUNT}$ (FIG. 11) for the purpose of measuring the amount of power delivered to a load and providing the voltage Vsense of FIG. 7-2.

Referring to FIG. 7-1, section 46 of current shunt monitoring circuitry 1-6 includes an operational amplifier 50 the output of which is connected to the gates of N-channel transistors MN0 and MN00. A signal SenseSupply, which represents the supply voltage applied through a current shunt resistor $R_{SHUNT}$ to a load 55 (FIG. 11), is applied to the (+) input of amplifier 50, and to one terminal of a capacitor C0. The drain of transistor MN0 is connected to provide $I_{VLoad}$ in conductor 4 and the drain of transistor MN00 is connected to provide $I_{VLoad2}$ in conductor 11 (also see FIG. 2). The source of transistor MN0 is coupled to the (−) input of operational amplifier 50 and to one terminal of a resistor R0, the other terminal of which is connected to a ground sensing conductor 45. The source of transistor MN00 is coupled by a resistor R8 to ground sensing conductor 45. This "feed" circuitry generates the identical currents $I_{VLoad}$ and $I_{VLoad2}$ which are proportional to SenseSupply; SenseSupply is a scaled-down representation of a users supply voltage (e.g., $V_{SUPPLY}$ in FIG. 11). Note that $I_{Load}$ typically, but not necessarily, is a DC current. For example, the impedance of load 55 in FIG. 11 might be suddenly reduced, causing $I_{Load}$ to increase and thereby causing $V_{SUPPLY}$ to decrease. In any case, the described analog multiplier circuitry produces a representation of the actual amount of power being dissipated by the load, irrespective of any variations in the power supply voltage $V_{SUPPLY}$.

Section 46 of current shunt monitoring circuitry 1-6 also includes an operational amplifier 51, the output of which is connected to the gates of N-channel transistors MN1 and MN2. A suitable reference voltage Vref is applied to the (+) input of amplifier 51. The drain of transistor MN1 is connected to provide a DC reference part or component of $I_{X+}$ and the drain of transistor MN2 is connected to provide a DC reference part or component of $I_{X-}$. The source of transistor MN1 is coupled to the (−) input of operational amplifier 51 and to one terminal of a resistor R9, the other terminal of which is connected to ground sensing conductor 45. The source of transistor MN2 is coupled by a resistor R10 to ground sensing conductor 45.

Referring to FIG. 7-2, section 47 of current shunt monitoring circuitry 1-6 includes an operational amplifier 53 the output of which is connected to the gates of N-channel transistors MN3 and MN4. Vsense is divided down by a resistive voltage divider 52 coupled to ground sensing conductor 45, and the divided-down representation of Vsense is applied to the (+) input of amplifier 53. Vsense represents the voltage developed across a current shunt resistor, such as $R_{SHUNT}$ in FIG. 11, due to a load current such as $I_{Load}$ delivered to load 55 in FIG. 11 through $R_{SHUNT}$. The drain of transistor MN3 is connected to provide a signal part or component of $V_{X+}$ that is proportional to Vsense, and the drain of transistor MN4 is connected to the gate of a N-channel transistor MN5 and the drain of a P-channel transistor MP10. The source of transistor MN4 is coupled to the (−) input of operational amplifier 53 and to one terminal of a resistor R4, the other terminal of which is connected to ground sensing conductor 45. The source of transistor MN3 is coupled by a resistor 3 to ground sensing conductor 45. P-channel transistors MP10, MP11, MP12, and MP13 and N-channel transistor MN5 form a current mirror provide an opposite-polarity signal part or component of $I_{X-}$ which is proportional to Vsense and which flows in the direction opposite to the direction of the DC part of $I_{X-}$ generated by transistor MN2 in FIG. 7-1. The sources of transistors MN4 and MN3 are coupled to ground by resistors R4 and R3, respectively.

Some of the remaining circuitry 48 shown in FIG. 7-2 is used to generate base current component corrections to currents $I_{VLoad}$ and $I_{VLoad2}$, respectively, as a function of the value of $V_{SUPPLY}$. Specifically, the scaled-down currents generated by current mirrors in circuitry 48, may be utilized to generate scaled-down replicas of the shunt voltage represented by Vsense which are utilized as corrections to $I_{VLoad}$ and $I_{VLoad2}$, respectively, and which are subtracted from the values of $I_{VLoad}$ and $I_{VLoad2}$ generated by circuitry 46 in FIG. 7-1 in order to correct the power output in response to the amount of voltage drop in the external current shunt resistor $R_{SHUNT}$ in FIG. 11.

Operational amplifier 50 in FIG. 7-1 causes transistors MN0 and MN00 to generate $I_{VLoad}$ and $I_{VLoad2}$ as single-ended inputs to multiplier 1-5 in response to SenseSupply, which represents the supply voltage applied to load 55 in FIG. 11 through current shunt resistor $R_{SHUNT}$. Operational amplifier 51 causes transistors MN1 and MN2 to generate matched DC components of $I_{X+}$ and $I_{X-}$ in response to reference voltage Vref. These matched DC components of $I_{X+}$ and $I_{X-}$ go into the differential input terminals of 2-1 and 3-1, respectively, of Gilbert multiplier 1-5. The previously defined reference current $Iref=(I_{X+}+I_{X-})/2$, in effect, scales the gain of multiplier 1-5 to provide a DC reference current component onto which a differential signal current $I_{X+}-I_{X-}$ produced in the drains of transistors MN3 and MP12 may be superimposed so that neither or $I_{X+}$ or $I_{X-}$ can be negative.

If $I_{X+}$ and $I_{X-}$ are equal, the voltages of the bases of transistors Q1 and Q0 are equal. In this case, $I_Y$ is split equally between transistors Q0 and Q1. This means the differential output current $I_{Mout+}-I_{Mout-}$ is zero. If a differential value of $I_{X+}$ and $I_{X-}$ is provided, for example if $I_{X+}$ is equal to $2I_{X-}$, then the base voltage of transistor Q0 is lower than the base voltage of transistor Q1 because more current flows through transistor Q2. That means transistor Q1 is turned on harder than transistor Q0, and the largest portion of $I_Y$ flows through transistor Q1 and a small portion of $I_Y$ flows through transistor Q0. In a differential pair of bipolar transistors such as Q0 and Q1, if there is a ratio of currents in the two transistors at a particular temperature, that ratio corresponds to a certain number of millivolts of difference in their base-emitter or $V_{BE}$ voltages. At room temperature, this 2-to-1 ratio of currents between $I_{X+}$ and $I_{X-}$ will develop an 18 mV difference in their $V_{BE}$ voltages. That 18 mV differential voltage driving Q0 and Q1 corresponds to a 2-to-1 ratio between their collector currents $I_{Mout+}$ and $I_{Mout-}$. Therefore, it can be shown that if the DC reference current component into $I_{X+}$ and $I_{X-}$ is substantially increased, then the above described 18 mV difference is decreased, and it can be shown that increasing the reference current $I_Y$ reduces the gain of a translinear Gilbert multiplier. The differential output current of the translinear Gilbert multiplier is $\{I_Y \times (I_{X+}-I_{X-})\} \div Iref$. Iref must be larger than the largest possible differential value of $I_{X+}-I_{X-}$ in order for the translinear Gilbert multiplier to operate properly.

The circuitry in block 48 of FIG. 7-2 operates to scale down the signals based on Vsense, which is proportional to the voltage across shunt resistor $R_{SHUNT}$, based on the gain of the translinear Gilbert multiplier circuit, and adjusts $I_{VLoad}$ and $I_{VLoad2}$ so as to subtract and correct for the effect of the voltage is developed across $R_{SHUNT}$.

More specifically, in FIG. 7-2, the voltage Vsense is proportional to the voltage $V_{SUPPLY}-V_{Load}$ across current shunt resistor $R_{SHUNT}$, and is scaled down by the two resistors 30-2 and 30-4 (FIG. 6) in voltage divider 52. Operational amplifier 53 converts the output of voltage divider 52 into two equal currents by means of transistors MN4 and MN3, the drains of which generate currents that are proportional to Vsense. The drain of transistor MN3 generates a current value which is proportional to Vsense and which is added as part of the $I_{X+}$ signal going into terminal 2-1 of multiplier 1-5, thereby adding that signal part of $I_{X+}$ to the DC reference part of $I_{X+}$ generated by transistor MN1 in FIG. 7-1. The current in the drain of transistor MN4 is mirrored by means of circuitry including transistors MP10, MP11, MN5, MP12, and MP13 to generate a Vsense signal part of $I_{X-}$ of the same magnitude and opposite direction to the signal part of $I_{X+}$ produced by transistor MN3 in FIG. 7-1. That Vsense signal part of $I_{X-}$ (which also is proportional to Vsense) is subtracted from the corresponding DC reference part of $I_{X-}$ coming from transistor MN2 and is applied to the $I_{X-}$ terminal 3-1 of multiplier 5-1.

Thus, the current shunt monitoring circuitry 1-6 of FIGS. 7-1 and 7-2 may be used along with the current shunt resistor $R_{SHUNT}$ to measure the amount of power being delivered from a supply voltage source to load 55 through a current shunt resistor. More specifically, current shunt monitor 1-7, which includes current shunt monitoring circuitry 1-6, is able to make measurements of the current through shunt resistor $R_{SHUNT}$ and the value of the power supply voltage Vsense-Supply, and also is able to (in effect) multiply the current through shunt resistor $R_{SHUNT}$ by the measured power supply voltage in order to obtain a measurement that represents the amount of power delivered by the power supply $V_{SUPPLY}$ to shunt resistor $R_{SHUNT}$ and load 55 (if the shunt resistance $R_{SHUNT}$ is sufficiently low that the power dissipated in it is negligible).

If the measured power supply voltage is sufficiently low that the actual voltage drop across shunt resistor $R_{SHUNT}$ becomes fairly large compared with the measured power supply voltage such that the amount of power dissipated in the shunt resistor is not negligible, then current shunt monitoring circuitry 1-6 also can be utilized to correct the total amount of "measured" power delivered by the power supply to both the shunt resistor and the load. This is accomplished by determining and subtracting the power dissipated in the shunt resistor from the power delivered by the power supply to the shunt resistor and load together, and that is accomplished by using circuitry in block 48 of FIG. 7-2 to subtract a bit of feed current from the amount of current $I_{VLoad}$ supplied to multiplier 1-5 in FIG. 7-1. The amount of subtracted feed current is scaled according to the proportion of the voltage drop across shunt resistor $R_{SHUNT}$ to the voltage $V_{Load}$.

Mode signals "nLowSupply", "nMedSupply", and "nHighSupply" in FIG. 7-2 may be used to change the gain of current shunt monitor 1-7 from its input to its output, and thereby deal with accuracy issues at different power supply voltages. It is necessary to scale how much of the voltage across shunt resistor $R_{SHUNT}$ is subtracted from $V_{SUPPLY}$, based on the magnitude of $V_{SUPPLY}$.

Figure 8:
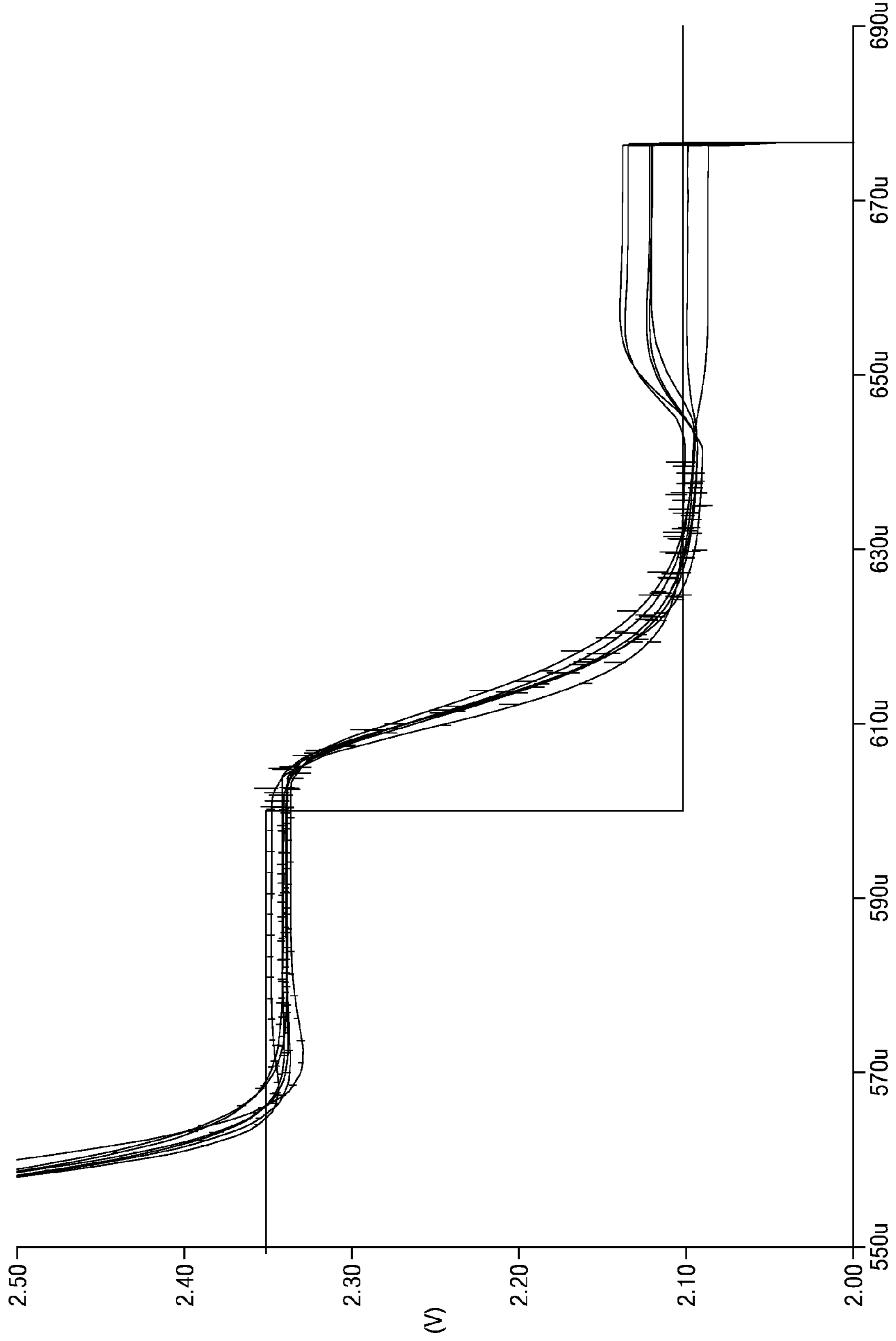
FIG. 8 is a graph illustrating simulated operation of the circuit of FIG. 7.

FIG. 8 is a graph which shows output transient based on 7 Monte Carlo simulations of the base current corrected segmented, chopped multiplier circuit 1-6 of FIG. 7. After a point located at about 640 microseconds on the horizontal scale, the chopper signal was turned off. The results to the left of that point show that the simulated circuit accuracy during the 7 Monte Carlo runs was relatively "tight", and that the output error spread increased by a factor of roughly 5 or 6 when the chopping function was turned off.

Thus, the embodiment of the invention shown in FIGS. 7-1 and 7-2 provides a two-quadrant translinear Gilbert multiplier in which most error sources, including gain, input offset voltage, and topological integrated circuit device matching errors, are corrected so as to allow their simultaneous implementation. The inherently wide range two-quadrant translinear Gilbert multiplier, together with the described base current correction circuitry has been found to provide excellent accuracy under all standard conditions. The base current correction improves the simulated gain accuracy characteristics of the translinear Gilbert multiplier from having ±7% error to having less than ±1% error (excluding the effects of transistor geometry mismatches). The described translinear Gilbert multiplier circuit may consist of multiple reversible translinear Gilbert multiplier cells that are interconnected so as to reduce the input offset voltage of the resulting "segmented" multiplier. Synchronous switching or chopping all of the reversible translinear Gilbert multiplier cells essentially eliminates the residual input offset voltage of the composite or segmented multiplier. Synchronous switches allow the base current correction circuits to function together with the chopped segmented multiplier. Merging the input of a chopped output amplifier with the chopped, segmented multiplier circuitry converts the chopped current output of the multiplier to a usable unchopped voltage output without degrading the offset performance of the translinear Gilbert multiplier. A scaled version of the differential shunt feed current input to the translinear Gilbert multiplier may be provided in order to subtract the power dissipated in the shunt resistor if needed. Overall, the embodiment of the invention in FIGS. 7-1 and 7-2 provides measurement values with errors of less than ±1%, which is far better than the ±7% or greater errors of the prior art.

While the invention has been described with reference to several particular embodiments thereof, those skilled in the art will be able to make various modifications to the described embodiments of the invention without departing from its true spirit and scope. It is intended that all elements or steps which are insubstantially different from those recited in the claims but perform substantially the same functions, respectively, in substantially the same way to achieve the same result as what is claimed are within the scope of the invention.

What is claimed is:

1. Analog multiplier circuitry comprising:

(a) a first multiplier circuit including a first transistor having an emitter coupled to a first conductor, a base coupled to a second conductor, and a collector coupled to a third conductor, a second transistor having an emitter coupled to the first conductor, a base coupled to a fourth conductor, and a collector coupled to a fifth conductor, a third transistor having an emitter coupled to the second conductor and a base and collector coupled to a first supply voltage, and a fourth transistor having an emitter coupled to the fourth conductor and a base and collector coupled to the first supply voltage; and (b) chopping circuitry including a first X switch for chopping a first differential input signal between sixth and seventh conductors to provide a corresponding chopped differential input signal between the second and fourth conductors, and a second X switch for un-chopping a first differential output signal produced between the third and fifth conductors by the first multiplier circuit to provide a corresponding un-chopped differential output signal between eighth and ninth conductors.

2. The analog multiplier circuitry of claim 1 wherein the first multiplier circuit is a segmented translinear Gilbert multiplier including a plurality of multiplier cells interconnected so as to reduce an input offset voltage of the segmented translinear Gilbert multiplier.

3. The analog multiplier circuitry of claim 1 including first and second correction circuits, the first correction circuit including a fifth transistor which has a base current equal to a base current of the first transistor, the first correction circuit operating in response to the base current of the fifth transistor to subtract a current equal to the base current of the first transistor from a first current in the first conductor and also to provide current equal to the base current of the first transistor in the second conductor to correct the first differential input signal for errors caused by the base current of the first transistor, the second correction circuit including a sixth transistor which has a base current equal to a base current of the second transistor, the second correction circuit operating in response to the base current of the sixth transistor to subtract a current equal to the base current of the second transistor from the first current in the first conductor and also to provide correction current equal to the base current of the second transistor in the fourth conductor to correct the first differential input signal for errors caused by the base current of the second transistor.

4. The analog multiplier circuitry of claim 3 wherein the first correction circuit includes a first operational amplifier having a first input coupled to a base of the fifth transistor, an output operative to control flow of the base current of the fifth transistor in a first current mirror, and a second input coupled to the second conductor and a first output of a first current mirror wherein the first output of the first current mirror supplies base current to the first transistor to effectively add correction current equal to the base current of the first transistor into the second conductor, a second output of the first current mirror being coupled to control a second current mirror, a first output of the second current mirror being coupled to subtract correction current equal to the base current of the first transistor from the first current in the first conductor, a second output of the second current mirror being coupled to subtract the correction current equal to the base current of the first transistor from a second current in a sixth conductor connected to an emitter of the fifth transistor, and wherein the second correction circuit includes a second operational amplifier having a first input coupled to a base of the sixth transistor, an output operative to control flow of the base current of the sixth transistor in a third current mirror, and a second input coupled to the fourth conductor and a first output of the third current mirror wherein the first output of the third current mirror supplies base current to the second transistor to effectively add correction current equal to the base current of the second transistor into the fourth conductor, a second output of the third current mirror being coupled to control a fourth current mirror, a first output of the fourth current mirror being coupled to subtract correction current equal to the base current of the second transistor from the first current in the first conductor, a second output of the fourth current mirror being coupled to subtract the correction current equal to the base current of the second transistor from the second current in the sixth conductor, the sixth conductor being connected to an emitter of the sixth transistor.

5. The analog multiplier circuitry of claim 4 including a first circuit for generating a first component of the first current in response to a voltage representative of a second supply voltage applied to a first terminal of a shunt resistor and for generating a DC signal onto which the first differential input signal is superimposed, and also including a second circuit for generating values of the first differential input signal in accordance with a sensing voltage developed across the shunt resistor in response to a load current flowing through the shunt resistor, wherein the first differential output signal represents the product of the load current flowing through the shunt resistor and the supply voltage.

6. The analog multiplier circuitry of claim 5 wherein the second circuit includes circuitry for adjusting the first current according to a supply voltage range control signal.

7. The analog multiplier circuitry of claim 5 wherein the first circuit also generates a first component of the second current in response to the voltage representative of the second supply voltage, and wherein the analog multiplier circuitry also includes a second circuit for generating first and second correction currents in accordance with a power supply range signal to be superimposed on the first current and the second current, respectively.

8. The analog multiplier circuitry of claim 3 including an output amplifier having inputs coupled to receive the differential output signal and having an output coupled to provide feedback through the second X switch to the inputs of the output amplifier.

9. The analog multiplier circuitry of claim 8 including a third X switch coupled between the output of the output amplifier and an input of an output buffer having an output coupled to the second X switch.

10. The analog multiplier circuitry of claim 9 including a low pass filter coupled between the third X switch and the input of the output buffer.

11. The analog multiplier circuitry of claim 2 wherein:

1) the segmented translinear Gilbert multiplier includes a first translinear Gilbert multiplier cell including the first, second, third, and fourth transistors, and wherein the segmented translinear Gilbert multiplier also includes a second translinear Gilbert multiplier cell having a topology essentially the same as the first translinear Gilbert multiplier cell and including first, second, third, and fourth transistors in a second translinear Gilbert multiplier cell, 2) the segmented translinear Gilbert multiplier includes a first X switch for coupling an emitter of the third transistor of the second translinear Gilbert multiplier cell to the emitter of one of the third and fourth transistors of the first Gilbert cell and coupling an emitter of the fourth transistor of the second translinear Gilbert multiplier cell to the emitter of the other of the third and fourth transistors of the first translinear Gilbert multiplier cell, in response to an offset adjustment signal, 3) the emitters of the first and second transistors of the second translinear Gilbert multiplier cell are directly coupled to the emitters of the first and second transistors, respectively, of the first translinear Gilbert multiplier cell, and 4) the segmented translinear Gilbert multiplier includes a second X switch for coupling a collector of the first transistor of the second translinear Gilbert multiplier cell to the collector of one of the first and second transistors of the first Gilbert cell and for coupling a collector of the second transistor of the second translinear Gilbert multiplier cell to the collector of the other of the first and second transistors of the first translinear Gilbert multiplier cell, in response to the offset adjustment signal.

12. The analog multiplier circuitry of claim 1 wherein the first X switch includes first and second input terminals and first and second output terminals, and also includes first, second, third, and fourth switches operative in accordance with a chopping signal to repeatedly couple the first and second input terminals to the first and second output terminals, respectively, and alternately couple the first and second input terminals to the second and first output terminals, respectively.

13. The analog multiplier circuitry of claim 3 wherein the first correction circuit is coupled to the second and fourth conductors by means of a first Y switch and the second correction circuit is coupled to the second and fourth conductors by means of a second Y switch, a first input of each of the first and second Y switches being coupled to the fourth conductor, a second input of each of the first and second Y switches being coupled to the second conductor, the first and second Y switches being operative to alternately couple the first and second correction circuits to opposite ones of the second and fourth conductors during alternate cycles of a chopping control signal that also controls the chopping circuitry.

14. The analog multiplier circuitry of claim 1 wherein the transistors are NPN transistors.

15. A method for providing increased accuracy in an analog multiplier, the method comprising:

(a) providing a first multiplier circuit including a first transistor having an emitter coupled to a first conductor, a base coupled to a second conductor, and a collector coupled to a third conductor, a second transistor having an emitter coupled to the first conductor, a base coupled to a fourth conductor, and a collector coupled to a fifth conductor, a third transistor having an emitter coupled to the second conductor and a base and collector coupled to a first supply voltage, and a fourth transistor having an emitter coupled to the fourth conductor and a base and collector coupled to the first supply voltage;

(b) chopping a first differential input signal between a sixth conductor and a seventh conductor to provide a corresponding chopped differential input signal between the second and fourth conductors; and (c) un-chopping a first differential output signal produced between the third and fifth conductors by the first multiplier circuit to provide a corresponding un-chopped differential output signal between an eighth conductor and a ninth conductor.

16. The method of claim 15 including providing a transistor base current that is equal to a base current of the first transistor and using the provided transistor base current to produce correction current equal to the base current of the first transistor which is subtracted from a first current in the first conductor, and providing another transistor base current that is equal to a base current of the first transistor and using that provided transistor base current to produce correction current equal to the base current of the second transistor which is subtracted from the first current, and using the provided transistor base current equal to the base current of the first transistor to add a correction current into the second conductor, and using the provided transistor base current equal to the base current of the second transistor to add a correction current into the fourth conductor.

17. The method of claim 15 including generating a DC component of the first current in response to a supply voltage applied to a first terminal of a shunt resistor, and generating a DC signal on which the first differential input signal is superimposed, and also generating values of the first differential input signal in accordance with a sensing voltage developed across the shunt resistor in response to a load current flowing through the shunt resistor, wherein the first differential output signal represents the product of the current flowing through the shunt resistor multiplied by the supply voltage.

18. The method of claim 15 including providing the first multiplier circuit as a combination of multiple multiplier cells and interconnecting the multiple multiplier cells so as to reduce the input offset voltage of the segmented translinear Gilbert multiplier in response to an offset adjustment signal.

19. An analog multiplier circuit, comprising:

(a) a first multiplier circuit including a first transistor having an emitter coupled to a first conductor, a base coupled to a second conductor, and a collector coupled to a third conductor, a second transistor having an emitter coupled to the first conductor, a base coupled to a fourth conductor, and a collector coupled to a fifth conductor, a third transistor having an emitter coupled to the second conductor and a base and collector coupled to a first supply voltage, and a fourth transistor having an emitter coupled to the fourth conductor and a base and collector coupled to the first supply voltage;

(b) means for chopping a first differential input signal between a sixth conductor and a seventh conductor to provide a corresponding chopped differential input signal between the second and fourth conductors; and (c) means for un-chopping a first differential output signal produced between the third and fifth conductors by the first multiplier circuit to provide a corresponding un-chopped differential output signal between an eighth conductor and a ninth conductor.

* * * * *